US011894557B2

(12) United States Patent
Sun

(10) Patent No.: US 11,894,557 B2
(45) Date of Patent: Feb. 6, 2024

(54) POSITIVE ACTIVE MATERIAL, METHOD OF PREPARING THE SAME, AND LITHIUM SECONDARY BATTERY INCLUDING THE SAME

(71) Applicant: BATTERY SOLUTION, Seoul (KR)

(72) Inventor: Yang-Kook Sun, Seoul (KR)

(73) Assignee: BATTERY SOLUTION, Seoul (KR)

( * ) Notice: Subject to any disclaimer, the term of this patent is extended or adjusted under 35 U.S.C. 154(b) by 208 days.

(21) Appl. No.: 16/961,673

(22) PCT Filed: Jan. 14, 2019

(86) PCT No.: PCT/KR2019/000561
§ 371 (c)(1),
(2) Date: Jul. 11, 2020

(87) PCT Pub. No.: WO2019/139445
PCT Pub. Date: Jul. 18, 2019

(65) Prior Publication Data
US 2020/0403240 A1     Dec. 24, 2020

(30) Foreign Application Priority Data

Jan. 12, 2018    (KR) ........................ 10-2018-0004416

(51) Int. Cl.
    *H01M 4/525*      (2010.01)
    *H01M 4/505*      (2010.01)
    (Continued)

(52) U.S. Cl.
    CPC ........... *H01M 4/525* (2013.01); *H01M 4/382* (2013.01); *H01M 4/505* (2013.01);
    (Continued)

(58) Field of Classification Search
None
See application file for complete search history.

(56) References Cited

U.S. PATENT DOCUMENTS 6,998,069 B1    2/2006    Coluccia et al.
2013/0344386 A1   12/2013   Kim et al.
(Continued)

FOREIGN PATENT DOCUMENTS

KR      10-0728717 A     6/2007
KR      10-0815583 B1    3/2008
(Continued)

OTHER PUBLICATIONS

Meng et al., Cation Ordering in Layered O3 Li[$Ni_xLi_{1/3-2x/3}Mn_{2/3-x/3}$]$O_2$ ($<x<\frac{1}{2}$) Compounds, Chemistry of Materials, American Chemical Society, 2005.

*Primary Examiner* — Carlos Barcena
(74) *Attorney, Agent, or Firm* — Maschoff Brennan

(57) ABSTRACT

A positive active material includes a secondary particle in which a plurality of primary particles is agglomerated. The positive active material is composed of, in which a compound containing nickel, lithium, and oxygen. An average angle between a reference line connecting a center portion of the secondary particle and a center portion of the primary particle provided at the outermost portion of the secondary particle and a particle orientation line penetrating the center portion of the primary particle provided at the outermost portion of the secondary particle and extending in parallel to an orientation direction of the primary particles is 12.2° or less. A concentration of the nickel in the compound is 59 mol % or more. The compound further includes an added metal composed of a different element from the nickel and the lithium. The added metal includes one or more of boron (B) and tungsten (W).

9 Claims, 42 Drawing Sheets

(51) Int. Cl.
  *H01M 4/38* (2006.01)
  *H01M 10/0525* (2010.01)
  *H01M 4/02* (2006.01)

(52) U.S. Cl.
  CPC .. *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2015/0147655 A1 | 5/2015 | Park et al. |
| 2015/0194666 A1 | 7/2015 | Nelson et al. |
| 2015/0214547 A1 | 7/2015 | Jordy et al. |
| 2016/0049647 A1* | 2/2016 | Park ............... H01M 4/131 |
| | | 429/209 |
| 2016/0181605 A1 | 6/2016 | Li et al. |
| 2018/0026268 A1* | 1/2018 | Kim ............... C01G 53/42 |
| | | 429/223 |
| 2018/0254511 A1 | 9/2018 | Park et al. |
| 2019/0020022 A1 | 1/2019 | Jeong et al. |

FOREIGN PATENT DOCUMENTS

| | | |
|---|---|---|
| KR | 10-2013-0143427 A | 12/2013 |
| KR | 10-2014-0119621 A | 10/2014 |
| KR | 10-2015-0083834 A | 7/2015 |
| KR | 10-2016-0094063 A | 8/2016 |
| KR | 10-1656935 B1 | 9/2016 |
| KR | 10-2017-0063397 A | 6/2017 |
| KR | 10-2017-0103389 A | 9/2017 |
| WO | 2017150949 A1 | 1/2015 |

* cited by examiner

NCM622

NCM622 + B 1%

NCM701515

NCM701515 + B 1%

NCA80

NCA80 + B 1%

NCA90

NCA90 + B 1%

NCM90

NCM90 + B 1%

POSITIVE ACTIVE MATERIAL, METHOD OF PREPARING THE SAME, AND LITHIUM SECONDARY BATTERY INCLUDING THE SAME

CROSS-REFERENCE TO RELATED APPLICATION

This application is a continuation of pending International Application No. PCT/KR2019/000561, which was filed on Jan. 14, 2019 and claims priority to Korean Patent Application Nos. 10-2018-0004416 and 10-2019-0004907 filed on Jan. 12, 2018 and Jan. 14, 2019 in the Korean Intellectual Property Office, the disclosures of which are hereby incorporated by reference in their entireties.

TECHNICAL FIELD

The present application relates to a positive active material, a method of preparing the same, and a lithium secondary battery including the same, and more particularly, to a positive active material in which boron is doped, a method of preparing the same, and a lithium secondary battery including the same.

BACKGROUND ART

With the development of portable mobile electronic devices, such as a smart phone, an MP3 player, and a tablet PC, the demand for secondary batteries capable of storing electric energy is explosively increasing.

Particularly, with the advent of electric vehicles, medium and large energy storing systems, and portable devices requiring high energy density, the demand for lithium secondary batteries is increasing. As such, the demand for the lithium secondary batteries increases, so that research and development of positive active materials used in the lithium secondary batteries is in progress. For example, Korean Patent Application Publication No. 10-2014-0119621 (Application No. 10-2013-0150315) discloses a secondary battery, in which the kind and a composition of metal substituted in a precursor are adjusted by using the precursor for preparing a positive active material including the excessive amount of lithium and adjusting the kind and the amount of metal added to exhibit high-voltage capacity and long life characteristics.

DISCLOSURE

Technical Problem

A technical problem to be solved by the present application is to provide a high-capacity positive active material, a method of preparing the same, and a lithium secondary battery including the same.

Another technical problem to be solved by the present application is to provide a positive active material having a long life-span, a method of preparing the same, and a lithium secondary battery including the same.

Another technical problem to be solved by the present application is to provide a highly stable positive active material, a method of preparing the same, and a lithium secondary battery including the same.

Another technical problem to be solved by the present application is to provide a positive active material in which a life-span shortening characteristic according to the number of times of charge/discharge is minimized, a method of preparing the same, and a lithium secondary battery including the same.

Another technical problem to be solved by the present application is to provide a positive active material doped with boron, a method of preparing the same, and a lithium secondary battery including the same.

Another technical problem to be solved by the present application is to provide a positive active material in which the generation of cracks according to the number of times of charge/discharge is minimized, a method of preparing the same, and a lithium secondary battery including the same.

Another technical problem to be solved by the present application is to provide a positive active material having a high nickel concentration, a method of preparing the same, and a lithium secondary battery including the same.

The technical problems to be solved by the present application are not limited to the foregoing.

Technical Solution

In order to solve the technical object, the present application provides a positive active material.

According to an exemplary embodiment, the positive active material includes a secondary particle in which a plurality of primary particles is agglomerated, in which the positive active material is composed of a compound containing nickel, lithium, and oxygen, and an average angle between a reference line that is a line connecting a center portion of the secondary particle and a center portion of the primary particle provided at the outermost portion of the secondary particle and a particle orientation line that is a line penetrating the center portion of the primary particle provided at the outermost portion of the secondary particle and extending in parallel to an orientation direction of the primary particles is 12.2° or less.

According to an exemplary embodiment, a positive active material includes a secondary particle in which a plurality of primary particles is agglomerated, in which the positive active material is composed of a compound containing nickel, lithium, and oxygen, a concentration of the nickel in the compound is 59 mol % or more, and an average angle between a reference line that is a line connecting a center portion of the secondary particle and a center portion of the primary particle provided at the outermost portion of the secondary particle and a particle orientation line that is a line penetrating the center portion of the primary particle provided at the outermost portion of the secondary particle and extending in parallel to an orientation direction of the primary particles decreases as the concentration of the nickel increases.

According to the exemplary embodiment, when the concentration of the nickel is 79 mol % or more, the average angle is 5.6° or less and a standard deviation may be 4.5 or less.

According to the exemplary embodiment, the compound may further include an added metal composed of a different element from the nickel and the lithium, and an aspect ratio of the primary particle may increase by the added metal.

According to the exemplary embodiment, the compound may further include at least one of aluminum, cobalt, and manganese.

According to the exemplary embodiment, the compound may further include an added metal composed of a different element from the nickel and the lithium, and the added metal may be included in the primary particle by doping of the added metal, and the added metal may be provided on a surface portion of the primary particle in at least a part of the primary particle.

According to the exemplary embodiment, the compound may further include an added metal composed of a different element from the nickel and the lithium, and the compound may be expressed by Chemical Formula 1 below, and (003) surface of the primary particle may increase and (014) surface and (104) surface may decrease by the added metal.

$$Li_aM1_xM2_yM3_zO_2$$ [Chemical Formula 1]

Herein, $1 \leq a \leq 1.1$, $0.59 \leq x < 1$, $0 \leq y \leq 0.2$, and $0 < z \leq 0.02$, and M1 is nickel, and M2 includes at least one of aluminum, cobalt, and manganese.

According to the exemplary embodiment, the (003) surface of the primary particle is arranged to be parallel to a direction from the center portion to a surface portion of the secondary particle.

According to the exemplary embodiment, the compound may further include an added metal composed of a different element from the nickel and the lithium, and the added metal may include at least one of boron (B), titanium (Ti), zirconium (Zr), tungsten (W), molybdenum (Mo), tin (Sn), and tantalum (Ta).

According to the exemplary embodiment, the compound may further include an added metal composed of a different element from the nickel and the lithium, and the added metal may include one or more of boron and tungsten, and a concentration of the added metal may be 2 mol % or less.

In order to solve the technical problem, the present invention provides a lithium secondary battery.

According to the exemplary embodiment, the lithium secondary battery may include: a positive electrode including the positive active material according to the exemplary embodiment of the present invention; a negative electrode spaced apart from the positive electrode; and an electrolyte between the positive electrode and the negative electrode.

According to the exemplary embodiment, an a-axis of a crystal structure of the plurality of primary particles of the positive active material may be extended in a direction from a center portion to a surface portion of the secondary particle, in a charge/discharge process, the primary particle may be contracted and expanded in a c-axis direction, and cracks generated between the adjacent primary particles may be aligned.

In order to solve the technical problem, the present invention provides a method of preparing a positive active material.

According to the exemplary embodiment, the method may include: preparing a positive active material precursor including a hydroxide containing nickel of 80 mol % or more by using a nickel precursor; and preparing a positive active material in which a compound containing nickel, lithium, and oxygen is doped with boron by mixing and calcining the positive active material precursor, lithium salt, and a boron precursor.

According to the exemplary embodiment, the method may include: preparing a positive active material precursor in which a hydroxide containing nickel of 79 mol % or more is doped with boron by using a nickel precursor and a boron precursor; and preparing a positive active material in which a compound containing nickel, lithium, and oxygen is doped with boron by mixing and calcining the positive active material precursor and lithium salt.

According to the exemplary embodiment, the preparing of the positive active material may include adding an aluminum precursor together with the positive active material precursor and mixing and calcining the positive active material precursor, the lithium salt, and the aluminum precursor.

Advantageous Effects

The positive active material according to the exemplary embodiment of the present invention may include a secondary particle in which a plurality of primary particles is agglomerated, and in which a compound containing nickel, lithium, and oxygen is doped with boron.

By the boron doping, the primary particle may have a high aspect ratio, and further, may have high orientation in which the primary particles are arranged in the form radiated from a center of the secondary particle. That is, an a-axis of the primary particles having the high aspect ratio may be highly consistent with the direction radiated from the center of the secondary particle. Accordingly, it is possible to minimize the generation of cracks by easily relaxing stress according to the contraction and the expansion of the primary particles in the charge/discharge process, and prevent an impurity phase by a parasitic reaction of an electrolyte from being generated even in an inner portion of the secondary particle.

Accordingly, it is possible to provide the positive active material with the minimized life-span shortening characteristic in the high-nickel positive active material.

DESCRIPTION OF DRAWINGS

FIG. 4B is a diagram illustrating an upper surface taken along line A-B of FIG. 3.

BEST MODE

Figure 1:
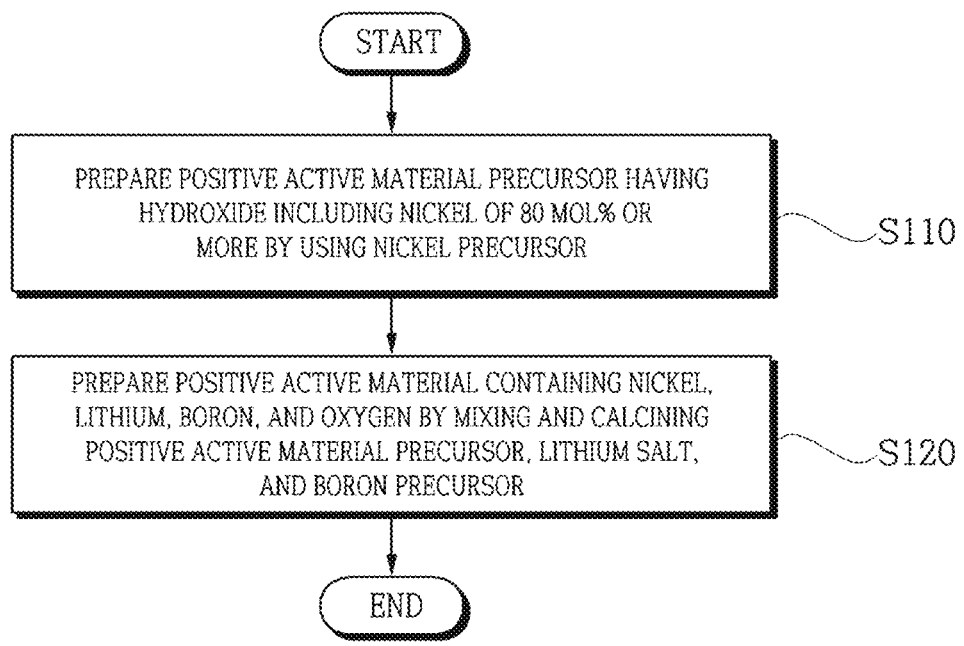
FIG. 1 is a flowchart for describing a method of preparing a positive active material according to an exemplary embodiment of the present invention.

Hereinafter, an exemplary embodiment of the present invention will be described in detail with reference to the accompanying drawings. However, the technical spirit of the present invention is not limited to the following exemplary embodiments, but may also be implemented in other forms. Rather, the embodiments introduced herein are provided so as to make the disclosed contents be thorough and complete and to fully transfer the spirit of the present invention to those skilled in the art.

In the present specification, when it is said that one constituent element is formed on another constituent element, the constituent element may be directly formed on another constituent element, or may be formed on the another constituent element with a third constituent element interposed therebetween. Further, in the drawings, thicknesses of layers and regions are exaggerated for the effective description of the technical contents.

Further, in the various exemplary embodiments of the present specification, although terms, such as "a first", "a second", and "a third", are used for describing various constituent elements, but the constituent elements are not limited by the terms. The terms are simply used for discriminating one constituent element from another constituent element. Accordingly, a first constituent element mentioned in any one exemplary embodiment may also be mentioned as a second constituent element in another exemplary embodiment. Each exemplary embodiment described and exemplified herein also includes a complementary exemplary embodiment thereof. Further, in the present specification, the term "and/or" is used as a meaning including at least one among the constituent elements listed before and after.

Singular expressions used herein include plurals expressions unless they have definitely opposite meanings in the context. It will be appreciated that terms "including" and "having" are intended to designate the existence of characteristics, numbers, steps, constituent elements, and a combination thereof described in the specification, and do not exclude a possibility of the existence or addition of one or more other characteristics, numbers, steps, constituent elements, or a combination thereof.

Further, in the following description of the present invention, when a detailed description of a related publicly known function or configuration is determined to unnecessarily make the subject matter of the present invention unclear, the detailed description thereof will be omitted.

Further, in the specification of the present application, a crystal system may consist of seven systems including a triclinic system, a monoclinic system, an orthorhombic system, a tetragonal system, a trigonal or rhombohedral system, a hexagonal system, and a cubic system.

Further, in the specification of the present application, "mol %" is interpreted to mean the content of predetermined element included in a positive active material or a positive active material precursor when it is assumed that the sum of remaining elements excluding lithium, oxygen, and hydrogen in the positive active material or the positive active material precursor is 100%.

Figure 2:
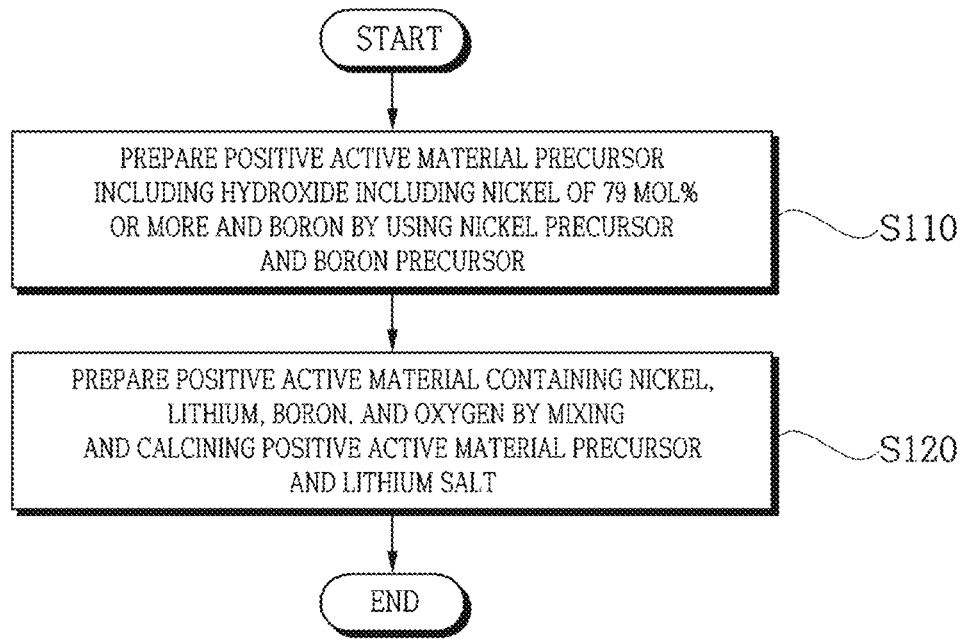
FIG. 2 is a flowchart for describing a method of preparing a positive active material according to another exemplary embodiment of the present invention.
Figure 3:
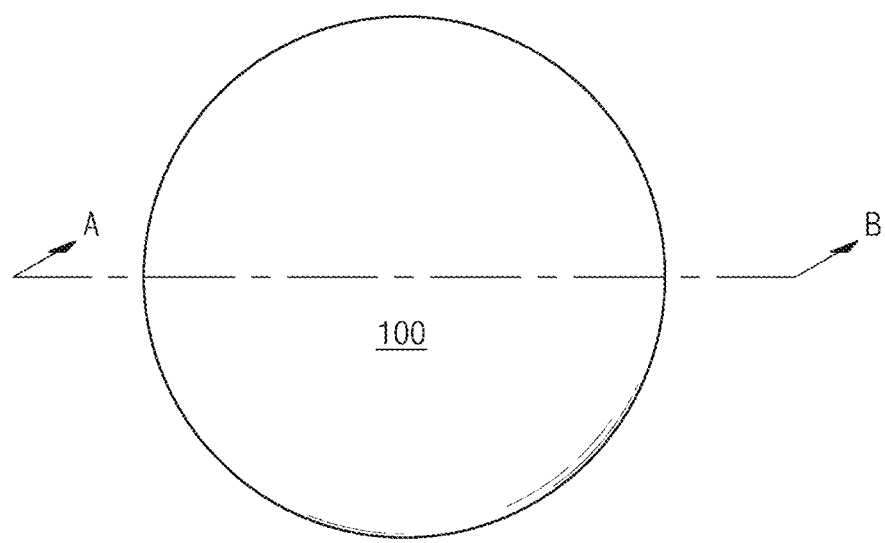
FIG. 3 is a diagram for describing a positive active material according to an exemplary embodiment of the present invention.
Figure 4A:
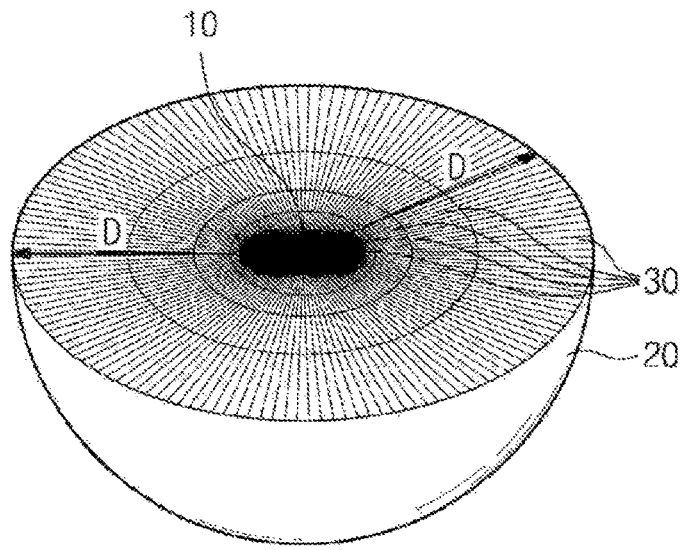
FIGS. 4A and FIG. 4B are diagrams taken along line A-B of FIG. 3.
Figure 5:
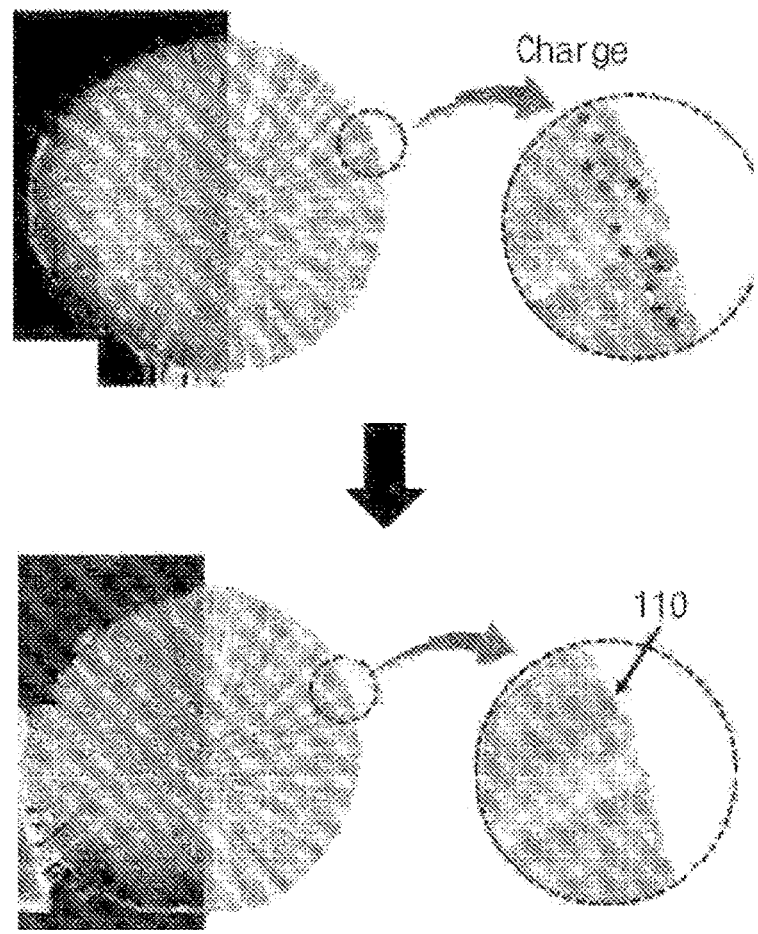
FIG. 5 is a diagram for describing a stress relaxation effect according to an alignment of primary particles of the positive active material according to the exemplary embodiment of the present invention.
Figure 4B:
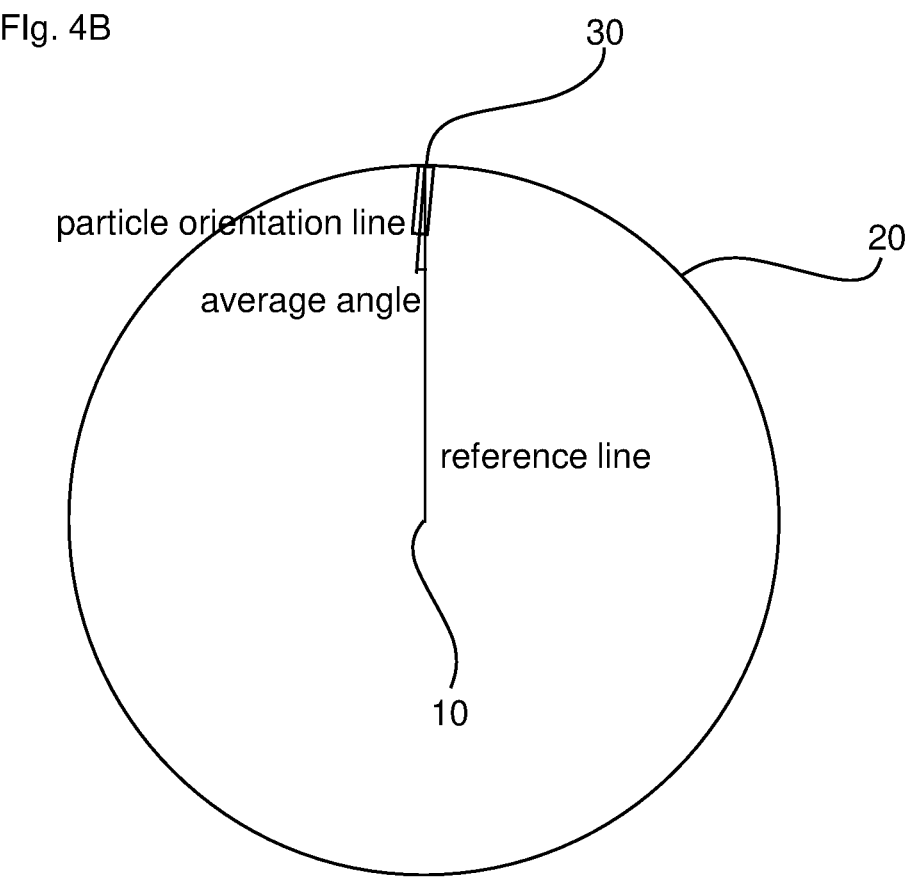
Figure 6:
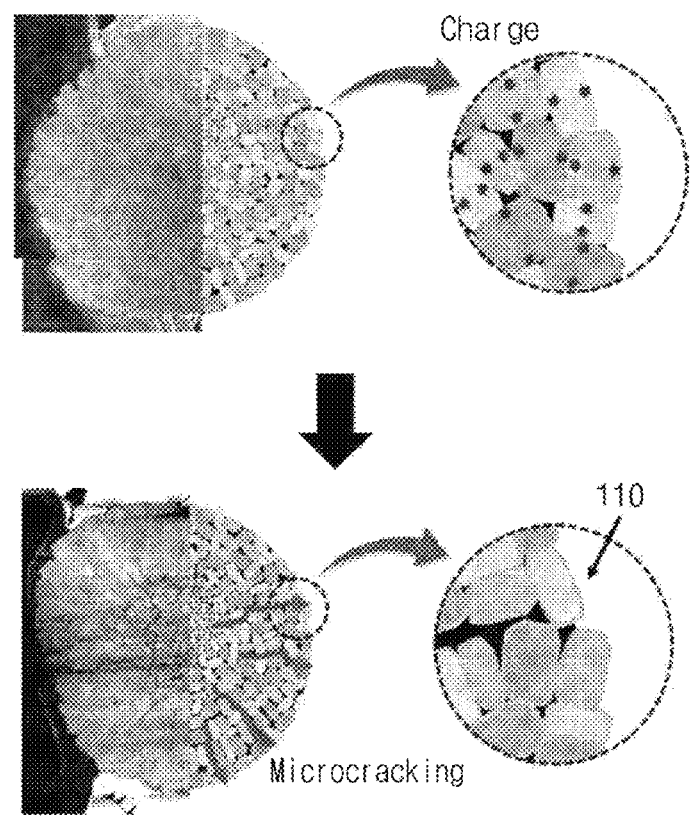
FIG. 6 is a diagram for describing a stress relaxation effect according to an alignment of primary particles of the positive active material according to a comparative example of the present invention.

FIG. 1 is a flowchart for describing a method of preparing a positive active material according to an exemplary embodiment of the present invention, FIG. 2 is a flowchart for describing a method of preparing a positive active material according to another exemplary embodiment of the present invention, FIG. 3 is a diagram for describing a positive active material according to an exemplary embodiment of the present invention, FIG. 4 is a diagram taken along line A-B of FIG. 3, FIG. 5 is a diagram for describing a stress relaxation effect according to an alignment of primary particles of the positive active material according to the exemplary embodiment of the present invention, and FIG. 6 is a diagram for describing a stress relaxation effect according to an alignment of primary particles of the positive active material according to a comparative example of the present invention.

Referring to FIGS. 1 to 6, a positive active material 100 according to an exemplary embodiment of the present invention may include a secondary particle in which a plurality of primary particles is agglomerated, in which the positive active material may be composed of a compound containing nickel, lithium, and oxygen, and an average angle between a reference line that is a line connecting a center portion of the secondary particle and a center portion of the primary particle provided at the outermost portion of the secondary particle and a particle orientation line that is a line penetrating the center portion of the primary particle provided at the outermost portion of the secondary particle and extending in parallel to an orientation direction of the primary particles may be 12.2° or less. Further, a positive active material 100 according to an exemplary embodiment of the present invention may include a secondary particle in which a plurality of primary particles is agglomerated, in which the positive active material may be composed of a compound containing nickel, lithium, and oxygen, a concentration of the nickel in the compound may be 59 mol % or more, and an average angle between a reference line that is a line connecting a center portion of the secondary particle and a center portion of the primary particle provided at the outermost portion of the secondary particle and a particle orientation line that is a line penetrating the center portion of the primary particle provided at the outermost portion of the secondary particle and extending in parallel to an orientation direction of the primary particles may decrease as the concentration of the nickel increases. The compound may further include an added metal composed of a different element from the nickel and the lithium, and an aspect ratio of the primary particle may increase by the added metal.

The compound may further include an added metal composed of a different element from the nickel and the lithium. Further, (003) surface of the primary particle may increase and (014) surface and (104) surface may decrease by the added metal. The added metal may include at least one of boron (B), titanium (Ti), zirconium (Zr), tungsten (W), molybdenum (Mo), tin (Sn), and tantalum (Ta). More particularly, the positive active material 100 may include a material in which a compound containing nickel, lithium, and oxygen is doped with the added metal. For example, the positive active material 100 may be the material in which a compound of lithium, nickel, and oxygen is doped with the added metal, the material in which a compound of lithium, nickel, cobalt, and oxygen is doped with the added metal, the material in which a compound of lithium, nickel, cobalt, manganese, and oxygen is doped with the added metal, and the material in which a compound of lithium, nickel, cobalt, aluminum, and oxygen is doped with the added metal.

According to the exemplary embodiment, a concentration of the added metal in the positive active material 100 may be 2 mol % or less. Particularly, in the positive active material 100, a concentration of the added metal may be less than 2 mol %.

Accordingly, a charge/discharge characteristic and a life-span characteristic of a lithium secondary battery including the positive active material 100 may be improved. In contrast, when the concentration of the added metal is 2 mol % or more, a charge/discharge characteristic and a life-span characteristic of a lithium secondary battery may deteriorate.

According to the exemplary embodiment, as a concentration of nickel in the positive active material 100 increases, the concentration of the added metal may decrease. That is, according to the concentration of nickel in the positive active material 100, the concentration of the doped added metal may be controlled.

According to the exemplary embodiment, a concentration of at least one of nickel, cobalt, manganese, and aluminum may be substantially constant in the positive active material 100. Otherwise, according to another exemplary embodiment, a concentration of at least one of nickel, cobalt, manganese, and aluminum in the positive active material 100 may have, in a direction from a center of a particle to a surface of the particle, a concentration gradient in the entire particle or a concentration gradient in a part of the particle. Otherwise, according to another exemplary embodiment, the positive active material 100 may include a core portion and a shell portion having a different concentration of metal (at least one of nickel, cobalt, manganese, and aluminum) from that of the core portion. The technical spirit according to the exemplary embodiment of the present invention may be applied to the positive active materials having various structures and forms.

According to the exemplary embodiment, the positive active material 100 may be represented by Chemical Formula 1 below.

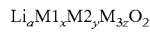  <Chemical Formula 1>

In Chemical Formula 1, 1≤a≤1.1, 0.79≤x<1, 0≤y≤0.2, and 0<z<0.02, and M1 is nickel, and M2 may include at least one of aluminum, cobalt, and manganese. Particularly, M3 may be boron (B).

The positive active material may include primary particles 30 and a secondary particle in which the primary particles 30 are agglomerated. As described above, when boron is doped, boron may be mainly provided on a surface portion of the primary particle 30.

The primary particles 30 may be extended in a direction in which the primary particles 30 are radiated from one region of an inner portion of the secondary particle to a surface portion 20 of the secondary particle. The one region of the inner portion of the secondary particle may be a center portion 10 of the secondary particle. That is, the primary particle 30 may have a rod shape extended from the one region of the inner portion of the secondary particle to the surface portion 20 of the secondary particle.

According to the exemplary embodiment, the primary particle 30 relatively adjacent to the surface portion 20 of the secondary particle may have a longer length in a direction from the center portion 10 of the inner portion of the secondary particle to the surface portion 20 of the secondary particle than the primary particle 30 relatively adjacent to the center portion of the inner portion 10 of the secondary particle. That is, in at least a part of the secondary particle extended from the center portion 10 to the surface portion 20 of the secondary particle, the lengths of the primary particles 30 may increase as the primary particles 30 are adjacent to the surface portion 20 of the secondary particle.

The lengths of the primary particles 30 may increase by the doped boron. The lengths of the primary particles 30 may be in the direction from the center portion 10 of the secondary particle to the surface portion 20. That is, an aspect ratio corresponding to a ratio of a length value of the primary particle 30 to a width of the primary particle 30 may increase. Accordingly, lithium ions may be easily provided into the secondary particle.

Further, by the boron doping, (003) surface of the primary particle 30 may increase and (014) surface and (104) surface may decrease, and (003) surface of the primary particle 30 may be arranged to be parallel to the direction from the center portion 10 to the surface portion 20 of the secondary particle. That is, an a-axis of a crystal structure of the primary particle 30 may be arranged to be parallel to the direction from the center portion 10 to the surface portion 20 of the secondary particle, and as described above, (003) surface of the primary particle 30 increases by the boron doping, so that the aspect ratio of the primary particle 30 may increase and an orientation property of the primary particle 30 may increase. For example, an average angle of an extension direction of the primary particles 30 located at the outermost portion of the secondary particle and the radiation direction from the center portion to the surface portion of the secondary particle may be 10° or less.

Accordingly, a movement path of metal ions (for example, lithium ions) and an electrolyte may be provided between the spaces between the primary particles 30 having the rod shapes, that is, the spaces between the primary particles 30 extended in a direction D from the center portion 10 to the surface portion 20 of the secondary particle. Accordingly, charge/discharge efficiency of a secondary battery including the positive active material according to the exemplary embodiment of the present invention may be improved.

According to insertion and de-intercalation of the lithium ions in the charge/discharge process of the lithium secondary battery including the positive active material, the primary particle may be contracted and expanded in a c-axis. According to the contraction and the expansion of the primary particle in the c-axis, a crack may be generated in the inner portion of the positive active material and the electrolyte may flow into the crack. By a parasitic reaction of the electrolyte flowing through the crack, a NiO-like impurity phase may be formed.

As described in FIG. 5, according to the exemplary embodiment of the present invention, by the boron doping, the primary particle may have a high aspect ratio and have orientation in which the primary particles are arranged in the form radiated from the center of the secondary particle. That is, the a-axis of the primary particles having the high aspect ratio may be highly consistent with the direction radiated from the center of the secondary particle. Accordingly, even though the primary particles are contracted and expanded in the c-axis direction in the charge/discharge process, the arranged primary particles easily relax stress, thereby minimizing the generation of the crack and preventing the Ni—O like impurity phase 110 by the parasitic reaction of the electrolyte from being generated up to the inner portion of the secondary particle.

In the meantime, unlike the exemplary embodiment of the present invention, when boron is not doped, as illustrated in FIG. 6, the primary particle may have a low aspect ratio and further may have lower orientation radiated from the center of the secondary particle. That is, the a-axis of the primary particles having the low aspect ratio may be little consistent with the direction radiated from the center of the secondary particle (randomly displaced). Accordingly, the crack may be easily generated in the inner portion of the secondary particle by stress generated in the contraction and expansion process of the primary particles in the c-axis direction in the charge/discharge process, and accordingly, the Ni—O like impurity phase 110 by the parasitic reaction of the electrolyte is generated up to the inner portion of the secondary particle, thereby degrading a charge/discharge characteristic and a life-span characteristic.

However, as described above, according to the exemplary embodiment of the present invention, the a-axis of the primary particles having the high aspect ratio is highly consistent with the direction radiated from the center of the secondary particle, so that the generation of the crack may be minimized during the charge/discharge process, thereby providing the positive active material with the improved charge/discharge capacity and life-span characteristic.

Subsequently, the method of preparing the positive active material according to the exemplary embodiment of the present invention will be described with reference to FIGS. 1 and 2.

Referring to FIG. 1, a positive active material precursor including a hydroxide including nickel of 80 mol % or more is prepared by using a nickel precursor (S110). The nickel precursor may be nickel sulfate. When the positive active material precursor includes cobalt, a cobalt precursor (for example, cobalt surface) may be further used, and when the positive active material precursor includes manganese, a manganese precursor (for example, manganese surface) may be further used.

For example, the positive active material precursor may be expressed by Chemical Formula 2 below.

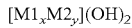   <Chemical Formula 2>

In Chemical formula 2, $0.80 \leq x \leq 1.00$, $0 \leq y \leq 0.2$, M1 is nickel, and M2 may include at least one of cobalt and manganese.

A positive active material, in which a compound containing nickel, lithium, and oxygen is doped with boron, may be prepared by mixing and calcining the positive active material precursor, lithium salt, and a boron precursor (S120). For example, the boron precursor may be a boron oxide ($B_2O_3$).

When the positive active material further includes aluminum, the operation of preparing of the positive active material may include mixing and calcining the positive active material precursor, lithium salt, a boron precursor, and an aluminum precursor.

A method of preparing a positive active material according to another exemplary embodiment of the present invention will be described.

Referring to FIG. 2, a positive active material precursor, in which a hydroxide including nickel of 79 mol % or more is doped with boron, may be prepared by using a nickel precursor and a boron precursor (S210). As described above, the nickel precursor may be nickel surface, and when the positive active material precursor includes cobalt, a cobalt precursor (for example, cobalt surface) may be further used, and when the positive active material precursor includes manganese, a manganese precursor (for example, manganese surface) may be further used. For example, the boron precursor may be a boron oxide ($B_2O_3$).

For example, the positive active material precursor may be expressed by Chemical Formula 3 below.

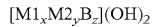   <Chemical Formula 3>

In Chemical Formula 3, $0.79 \leq x \leq 1$, $0 \leq y \leq 0.2$, and $0 < z < 0.02$, and M1 is nickel, and M2 may include at least one of aluminum, cobalt, and manganese.

A positive active material, in which a compound containing nickel, lithium, and oxygen is doped with boron, may be prepared by mixing and calcining the positive active material precursor and lithium salt (S220).

As described above, when the positive active material further includes aluminum, the preparing of the positive active material may include mixing and calcining the positive active material precursor, lithium salt, and an aluminum precursor.

Hereinafter, the particular method of preparing the positive active material according to the exemplary embodiment of the present invention and a characteristic evaluation result will be described.

Prepare positive active material according to Comparative Example 1-1 (Ni 60, Co 20, Mn 20)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 60:20:20, and an ammonia aqueous solution were continuously added to the reactor. Further, a sodium hydroxide solution was simultaneously supplied for pH adjustment to prepare a $[Ni_{0.60}Co_{0.20}Mn_{0.20}](OH)_2$ metal composite hydroxide.

The prepared $[Ni_{0.60}Co_{0.20}Mn_{0.20}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 850° C. in an oxygen atmosphere to prepare $Li[Ni_{0.60}Co_{0.20}Mn_{0.20}]O_2$ positive active material powder.

Prepare positive active material according to Example 1-1 (Ni 59, Co 20, Mn 20, B 1)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 60:20:20, and an ammonia aqueous solution were continuously added to the reactor. Further, a sodium hydroxide solution was simultaneously supplied for pH adjustment to prepare a $[Ni_{0.60}Co_{0.20}Mn_{0.20}](OH)_2$ metal composite hydroxide.

The prepared $[Ni_{0.60}Co_{0.20}Mn_{0.20}](OH)_2$ metal composite hydroxide was washed with water, filtered, and then dried at a vacuum drier at 110° C. The metal composite hydroxide, a boron oxide ($B_2O_3$), and a lithium hydroxide (LiOH) were mixed at a molar ratio of 0.99:0.005:1.01 and then calcined at 850° C. in an oxygen atmosphere to prepare $Li[Ni_{0.59}Co_{0.20}Mn_{0.20}B_{0.01}]O_2$ positive active material powder.

Prepare positive active material according to Comparative Example 1-2 (Ni 70, Co 15, Mn 15)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 70:15:15, and an ammonia aqueous solution were continuously added to the reactor. Further, a sodium hydroxide solution was simultaneously supplied for pH adjustment to prepare a [Ni$_{0.70}$Co$_{0.50}$Mn$_{0.15}$](OH)$_2$ metal composite hydroxide.

The prepared [Ni$_{0.70}$Co$_{0.05}$Mn$_{0.15}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 800° C. in an oxygen atmosphere to prepare Li[Ni$_{0.7}$Co$_{0.15}$Mn$_{0.15}$]O$_2$ positive active material powder.

Prepare positive active material according to Example 1-2 (Ni 69, Co 15, Mn 15, B 1)

Distilled water was added to a co-precipitation reactor and then stirred while N$_2$ gas was supplied to the reactor. A metal aqueous solution, in which a molar ratio of nickel sulfate, cobalt sulfate, and manganese sulfate is 70:15:15, and an ammonia aqueous solution were continuously added to the reactor. Further, a sodium hydroxide solution was simultaneously supplied for pH adjustment to prepare a [Ni$_{0.70}$Co$_{0.05}$Mn$_{0.15}$](OH)$_2$ metal composite hydroxide.

The prepared [Ni$_{0.70}$Co$_{0.15}$Mn$_{0.15}$](OH)$_2$ metal composite hydroxide was washed with water, filtered, and then dried at a vacuum drier at 110° C. The metal composite hydroxide, a boron oxide (B$_2$O$_3$), and a lithium hydroxide (LiOH) were mixed at a molar ratio of 0.99:0.005:1.01 and then calcined at 800° C. in an oxygen atmosphere to prepare Li[Ni$_{0.69}$Co$_{0.15}$Mn$_{0.15}$B$_{0.01}$]O$_2$ positive active material powder.

Prepare positive active material according to Comparative Example 1-3 (Ni 80, Co 16, Al 4)

Distilled water was added to a co-precipitation reactor and then stirred while N$_2$ gas was supplied to the reactor. A metal aqueous solution, in which a molar ratio of nickel sulfate and cobalt sulfate is 83:17, and an ammonia aqueous solution were continuously added to the reactor. Further, a sodium hydroxide solution was supplied for pH adjustment to prepare a [Ni$_{0.83}$Co$_{0.17}$](OH)$_2$ metal composite hydroxide.

The prepared [Ni$_{0.83}$Co$_{0.17}$](OH)$_2$ metal composite hydroxide was washed with water, filtered, and then dried at a vacuum drier at 110° C. The metal composite hydroxide, an aluminum hydroxide (Al(OH)$_3$), and a lithium hydroxide (LiOH) were mixed at a molar ratio of 0.96:0.04:1.01 and then calcined at 750° C. in an oxygen atmosphere to prepare Li[Ni$_{0.80}$Co$_{0.16}$Al$_{0.04}$]O$_2$ positive active material powder.

Prepare positive active material according to Example 1-3 (Ni 79, Co 16, Al 4, B 1)

Distilled water was added to a co-precipitation reactor and then stirred while N$_2$ gas was supplied to the reactor. A metal aqueous solution, in which a molar ratio of nickel sulfate and cobalt sulfate is 83:17, and an ammonia aqueous solution were continuously added to the reactor. Further, a sodium hydroxide solution was supplied for pH adjustment to prepare a [Ni$_{0.83}$Co$_{0.17}$](OH)$_2$ metal composite hydroxide.

The prepared [Ni$_{0.83}$Co$_{0.17}$](OH)$_2$ metal composite hydroxide was washed with water, filtered, and then dried at a vacuum drier at 110° C. The metal composite hydroxide, a boron oxide (B$_2$O$_3$), an aluminum oxide (Al(OH)$_3$), and a lithium hydroxide (LiOH) were mixed at a molar ratio of 0.95:0.005:0.04:1.01 and then calcined at 750° C. in an oxygen atmosphere to prepare Li[Ni$_{0.79}$Co$_{0.16}$Al$_{0.04}$B$_{0.01}$]O$_2$ positive active material powder.

Prepare positive active material according to Comparative Example 1-4 (Ni 88.5, Co 10, Al 1.5)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution was supplied for pH adjustment to prepare a [Ni$_{0.90}$Co$_{0.10}$](OH)$_2$ metal composite hydroxide.

The prepared [Ni$_{0.90}$Co$_{0.10}$](OH)$_2$ metal composite hydroxide was washed with water, filtered, and then dried at a vacuum drier at 110° C. The metal composite hydroxide, an aluminum hydroxide (Al(OH)$_3$), and a lithium hydroxide (LiOH) were mixed at a molar ratio of 0.985:0.015:1.01 and then calcined at 730° C. in an oxygen atmosphere to prepare Li[Ni$_{0.885}$Co$_{0.10}$Al$_{0.015}$]O$_2$ positive active material powder.

Prepare positive active material according to Example 1-4-1 (Ni 87.5, Co 10, Al 1.5, B 1)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution was supplied for pH adjustment to prepare a [Ni$_{0.0.90}$Co$_{0.10}$](OH)$_2$ metal composite hydroxide.

The prepared [Ni$_{0.90}$Co$_{0.10}$](OH)$_2$ metal composite hydroxide was washed with water, filtered, and then dried at a vacuum drier at 110° C. The metal composite hydroxide, a boron oxide (B$_2$O$_3$), an aluminum oxide (Al(OH)$_3$), and a lithium hydroxide (LiOH) were mixed at a molar ratio of 0.975:0.005:0.015:1.01 and then calcined at 730° C. in an oxygen atmosphere to prepare Li[Ni$_{0.875}$Co$_{0.10}$Al$_{0.015}$B$_{0.01}$]O$_2$ positive active material powder.

Prepare positive active material according to Example 1-4-2 (Ni 86.5, Co 10, Al 1.5, B 2)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution was supplied for pH adjustment to prepare a [Ni$_{0.90}$Co$_{0.10}$](OH)$_2$ metal composite hydroxide.

The prepared [Ni$_{0.90}$Co$_{0.10}$](OH)$_2$ metal composite hydroxide was washed with water, filtered, and then dried at a vacuum drier at 110° C. The metal composite hydroxide, a boron oxide (B$_2$O$_3$), an aluminum oxide (Al(OH)$_3$), and a lithium hydroxide (LiOH) were mixed at a molar ratio of 0.965:0.01:0.015:1.01 and then calcined at 730° C. in an oxygen atmosphere to prepare Li[Ni$_{0.865}$Co$_{0.10}$Al$_{0.015}$B$_{0.02}$]O$_2$ positive active material powder.

Prepare positive active material according to Comparative Example 1-5 (Ni 90, Co 5, Mn 5)

Distilled water was added to a co-precipitation reactor and then stirred while N$_2$ gas was supplied to the reactor. A metal aqueous solution, in which a molar ratio of nickel sulfate, cobalt sulfate, and manganese sulfate is 90:5:5, and an ammonia aqueous solution were continuously added to the reactor. Further, a sodium hydroxide solution was simultaneously supplied for pH adjustment to prepare a [Ni$_{0.90}$Co$_{0.05}$Mn$_{0.05}$](OH)$_2$ metal composite hydroxide.

The prepared [Ni$_{090}$Co$_{0.05}$Mn$_{0.05}$](OH)$_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 750° C. in an oxygen atmosphere to prepare Li[Ni$_{0.90}$Co$_{0.05}$Mn$_{0.05}$]O$_2$ positive active material powder.

Prepare positive active material according to Example 1-5-1 (Ni 89.6, Co 5, Mn 5, B 0.4)

Distilled water was added to a co-precipitation reactor and then stirred while N$_2$ gas was supplied to the reactor. A metal aqueous solution, in which a molar ratio of nickel sulfate, cobalt sulfate, and manganese sulfate is 90:5:5, and an ammonia aqueous solution were continuously added to the reactor. Further, a sodium hydroxide solution was supplied for pH adjustment to prepare a $[Ni_{0.90}Co_{0.05}Mn_{0.05}](OH)_2$ metal composite hydroxide.

The prepared $[Ni_{0.90}Co_{0.05}Mn_{0.05}](OH)_2$ metal composite hydroxide was washed with water, filtered, and then dried at a vacuum drier at 110° C. The metal composite hydroxide, a boron oxide ($B_2O_3$), and a lithium hydroxide (LiOH) were mixed at a molar ratio of 0.996:0.002:1.01 and then calcined at 750° C. in an oxygen atmosphere to prepare $Li[Ni_{0.896}Co_{0.05}Mn_{0.05}B_{0.004}]O_2$ positive active material powder.

Prepare positive active material according to Example 1-5-2 (Ni 89, Co 5, Mn 5, B 1)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 90:5:5, and an ammonia aqueous solution were continuously added to the reactor. Further, a sodium hydroxide solution was supplied for pH adjustment to prepare a $[Ni_{0.90}Co_{0.05}Mn_{0.05}](OH)_2$ metal composite hydroxide.

The prepared $[Ni_{0.90}Co_{0.05}Mn_{0.05}](OH)_2$ metal composite hydroxide was washed with water, filtered, and then dried at a vacuum drier at 110° C. The metal composite hydroxide, a boron oxide ($B_2O_3$), and a lithium hydroxide (LiOH) were mixed at a molar ratio of 0.99:0.005:1.01 and then calcined at 750° C. in an oxygen atmosphere to prepare $Li[Ni_{0.89}Co_{0.05}Mn_{0.05}B_{0.01}]O_2$ positive active material powder.

Prepare positive active material according to Example 1-5-3 (Ni 88, Co 5, Mn 5, B 2)

Distilled water was added to a co-precipitation reactor and then stirred while $N_2$ gas was supplied to the reactor. A metal aqueous solution, in which a molar ratio of nickel sulfate, cobalt sulfate, and manganese sulfate is 90:5:5, and an ammonia aqueous solution were continuously added to the reactor. Further, a sodium hydroxide solution was supplied for pH adjustment to prepare a $[Ni_{0.90}Co_{0.05}Mn_{0.05}](OH)_2$ metal composite hydroxide.

The prepared $[Ni_{0.90}Co_{0.005}Mn_{0.05}](OH)_2$ metal composite hydroxide was washed with water, filtered, and then dried at a vacuum drier at 110° C. The metal composite hydroxide, a boron oxide ($B_2O_3$), and a lithium hydroxide (LiOH) were mixed at a molar ratio of 0.98:0.01:1.01 and then calcined at 750° C. in an oxygen atmosphere to prepare $Li[Ni_{0.88}Co_{0.05}Mn_{0.05}B_{0.02}]O_2$ positive active material powder.

Prepare positive active material according to Comparative Example 1-6 (Ni 95, Co 4, Al 1)

Distilled water was added to a co-precipitation reactor and then stirred while $N_2$ gas was supplied to the reactor. A metal aqueous solution, in which a molar ratio of nickel sulfate and cobalt sulfate is 96:4, and an ammonia aqueous solution were continuously added to the reactor. Further, a sodium hydroxide solution was simultaneously supplied for pH adjustment to prepare a $[Ni_{0.96}Co_{0.04}](OH)_2$ metal composite hydroxide.

The prepared $[Ni_{0.96}Co_{0.04}](OH)_2$ metal composite hydroxide was washed with water, filtered, and then dried at a vacuum drier at 110° C. The metal composite hydroxide, an aluminum hydroxide ($Al(OH)_3$), and a lithium hydroxide (LiOH) were mixed at a molar ratio of 0.99:0.01:1.01 and then calcined at 730° C. in an oxygen atmosphere to prepare $Li[Ni_{0.95}Co_{0.04}Al_{0.01}]O_2$ positive active material powder.

Prepare positive active material according to Example 1-6 (Ni 94, Co 4, Al 1, B 1)

Distilled water was added to a co-precipitation reactor and then stirred while $N_2$ gas was supplied to the reactor. A metal aqueous solution, in which a molar ratio of nickel sulfate and cobalt sulfate is 96:4, and an ammonia aqueous solution were continuously added to the reactor. Further, a sodium hydroxide solution was supplied for pH adjustment to prepare a $[Ni_{0.96}Co_{0.04}](OH)_2$ metal composite hydroxide.

The prepared $[Ni_{0.96}Co_{0.04}](OH)_2$ metal composite hydroxide was washed with water, filtered, and then dried at a vacuum drier at 110° C. The metal composite hydroxide, a boron oxide ($B_2O_3$), an aluminum oxide ($Al(OH)_3$), and a lithium hydroxide (LiOH) were mixed at a molar ratio of 0.98:0.005:0.01:1.01 and then calcined at 730° C. in an oxygen atmosphere to obtain $Li[Ni_{0.94}Co_{0.04}Al_{0.01}B_{0.01}]O_2$ positive active material powder.

Prepare positive active material according to Example 2-1-1 (Ni 89.5, Co 10 B 0.5)

Distilled water was added to a co-precipitation reactor and then stirred while $N_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution, in which a boron oxide ($B_2O_3$) was dissolved by 0.01 M, was simultaneously supplied for pH adjustment and the boron doping to prepare a $[Ni_{0.895}Co_{0.01}B_{0.005}](OH)_2$ metal composite hydroxide.

The prepared $[Ni_{0.895}Co_{0.10}B_{0.005}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 730° C. in an oxygen atmosphere to prepare $Li[Ni_{0.895}Co_{0.10}B_{0.005}]O_2$ positive active material powder.

Prepare positive active material according to Example 2-1-2 (Ni 89, Co 10 B 1)

Distilled water was added to a co-precipitation reactor and then stirred while $N_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution, in which a boron oxide ($B_2O_3$) was dissolved by 0.02 M, was simultaneously supplied for pH adjustment and the boron doping to prepare a $[Ni_{0.89}Co_{0.10}B_{0.01}](OH)_2$ metal composite hydroxide.

The prepared $[Ni_{0.89}Co_{0.010}B_{0.01}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 730° C. in an oxygen atmosphere to prepare $Li[Ni_{0.89}Co_{0.10}B_{0.01}]O_2$ positive active material powder.

Prepare positive active material according to Example 2-1-3 (Ni 88, Co 10 B 2)

Distilled water was added to a co-precipitation reactor and then stirred while $N_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution, in which a boron oxide ($B_2O_3$) was dissolved by 0.04 M, was simultaneously supplied for pH adjustment and the boron doping to prepare a $[Ni_{0.88}Co_{0.10}B_{0.02}](OH)_2$ metal composite hydroxide.

The prepared $[Ni_{0.88}Co_{0.10}B_{0.02}](OH)_2$ metal composite hydroxide was washed with water, filtered, and then dried at a vacuum drier at 110° C. The metal composite hydroxide and a lithium hydroxide (LiOH) were mixed at a molar ratio of 1:1.01 and then calcined at 730° C. in an oxygen atmosphere to prepare Li[Ni$_{0.88}$Co$_{0.10}$B$_{0.02}$]O$_2$ positive active material powder.

Prepare positive active material according to Example 2-2-1 (Ni 88, Co 10, Al 1.5, B 0.5)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution, in which a boron oxide (B$_2$O$_3$) was dissolved by 0.01 M, was simultaneously supplied for pH adjustment and the boron doping to prepare a [Ni$_{0.895}$Co$_{0.10}$Bo$_{0.005}$](OH)$_2$ metal composite hydroxide.

The prepared [Ni$_{0.895}$Co$_{0.10}$B$_{0.005}$](OH)$_2$ metal composite hydroxide was washed with water, filtered, and then dried at a vacuum drier at 110° C. The metal composite hydroxide, an aluminum hydroxide (Al(OH)$_3$), and a lithium hydroxide (LiOH) were mixed at a molar ratio of 0.985:0.015:1.01 and then calcined at 730° C. in an oxygen atmosphere to prepare Li[Ni$_{0.88}$Co$_{0.10}$Al$_{0.015}$B$_{0.005}$]O$_2$ positive active material powder.

Prepare positive active material according to Example 2-2-2 (Ni 87.5, Co 10, Al 1.5, B 1)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution, in which a boron oxide (B$_2$O$_3$) was dissolved by 0.02 M, was simultaneously supplied for pH adjustment and the boron doping to prepare a [Ni$_{0.89}$Co$_{0.10}$B$_{0.01}$](OH)$_2$ metal composite hydroxide.

The prepared [Ni$_{0.89}$Co$_{0.10}$B$_{0.01}$](OH)$_2$ metal composite hydroxide was washed with water, filtered, and then dried at a vacuum drier at 110° C. The metal composite hydroxide, an aluminum hydroxide (Al(OH)$_3$), and a lithium hydroxide (LiOH) were mixed at a molar ratio of 0.985:0.015:1.01 and then calcined at 730° C. in an oxygen atmosphere to prepare Li[Ni$_{0.875}$Co$_{0.10}$Al$_{0.015}$B$_{0.01}$]O$_2$ positive active material powder.

Prepare positive active material according to Example 2-2-3 (Ni 86.5, Co 10, Al 1.5, B 2)

Distilled water was added to a co-precipitation reactor and then stirred while N$_2$ gas was supplied to the reactor. A metal aqueous solution, in which a molar ratio of nickel sulfate and cobalt sulfate is 90:10, and an ammonia aqueous solution were continuously added to the reactor. Further, a sodium hydroxide solution, in which a boron oxide (B$_2$O$_3$) was dissolved by 0.04 M, was simultaneously supplied for pH adjustment and the boron doping to prepare a [Ni$_{0.88}$Co$_{0.10}$B$_{0.02}$](OH)$_2$ metal composite hydroxide.

The prepared [Ni$_{0.88}$Co$_{0.10}$B$_{0.02}$](OH)$_2$ metal composite hydroxide was washed with water, filtered, and then dried at a vacuum drier at 110° C. The metal composite hydroxide, an aluminum hydroxide (Al(OH)$_3$), and a lithium hydroxide (LiOH) were mixed at a molar ratio of 0.985:0.015:1.01 and then calcined at 730° C. in an oxygen atmosphere to prepare Li[Ni$_{0.865}$Co$_{0.10}$Al$_{0.015}$B$_{0.02}$]O$_2$ positive active material powder.

Prepare positive active material according to Example 3 (Ni 89, Co 5, Mn 5, W 1)

WO$_3$ powder was dissolved in a lithium hydroxide solution at a concentration of 0.47 M. A basic aqueous solution, in which W was dissolved, was prepared by dissolving the prepared solution in a sodium hydroxide solution. Distilled water was added to a co-precipitation reactor and then stirred while N$_2$ gas was supplied to the reactor. A metal aqueous solution, in which a molar ratio of nickel sulfate, cobalt sulfate, and manganese sulfate is 90:5:5, and an ammonia solution were continuously added to the reactor. Further, the basic aqueous solution, in which W was dissolved, was supplied for pH adjustment and the addition of tungsten to prepare a [Ni$_{0.89}$Co$_{0.05}$Mn$_{0.05}$W$_{0.01}$](OH)$_2$ metal composite hydroxide.

The prepared [Ni$_{0.89}$Co$_{0.05}$Mn$_{0.05}$W$_{0.01}$](OH)$_2$ metal composite hydroxide was washed with water, filtered, and then dried at a vacuum drier at 110° C. for 12 hours. The metal composite hydroxide and a lithium hydroxide (LiOH) were mixed at a molar ratio of 1:1.01 and then calcined at 770° C. in an oxygen atmosphere to obtain Li[Ni$_{0.89}$Co$_{0.05}$Mn$_{0.05}$W$_{0.01}$]O$_2$ positive active material powder.

The compositions (mol %) of the positive active materials according to the Examples and the Comparative Examples of the present invention are represented in the table below.

TABLE 1

|  | Ni | Co | Mn | Al | B |
|---|---|---|---|---|---|
| Comparative Example 1-1 | 60 | 20 | 20 | — | — |
| Example 1-1 | 59 | 20 | 20 | — | 1 |
| Comparative Example 1-2 | 70 | 15 | 15 | — | — |
| Example 1-2 | 69 | 15 | 15 | — | 1 |
| Comparative Example 1-3 | 80 | 16 | — | 4 | — |
| Example 1-3 | 79 | 16 | — | 4 | 1 |
| Comparative Example 1-4 | 88 | 10 | — | 2 | — |
| Example 1-4-1 | 87 | 10 | — | 2 | 1 |
| Example 1-4-2 | 86 | 10 | — | 2 | 2 |
| Comparative Example 1-5 | 90 | 5 | 5 | — | — |
| Example 1-5-1 | 89.6 | 5 | 5 | — | 0.4 |
| Example 1-5-2 | 89 | 5 | 5 | — | 1 |
| Example 1-5-3 | 88 | 5 | 5 | — | 2 |
| Comparative Example 1-6 | 95 | 4 | — | 1 | — |
| Example 1-6 | 94 | 4 | — | 1 | 1 |

TABLE 2

|  | Ni | Co | Mn | Al | B |
|---|---|---|---|---|---|
| Example 2-1-1 | 89.5 | 10 | — | — | 0.5 |
| Example 2-1-2 | 89 | 10 | — | — | 1 |
| Example 2-1-3 | 88 | 10 | — | — | 2 |
| Example 2-2-1 | 88 | 10 | — | 1.5 | 0.5 |
| Example 2-2-2 | 87.5 | 10 | — | 1.5 | 1 |
| Example 2-2-3 | 86.5 | 10 | — | 1.5 | 2 |

TABLE 3

|  | Ni | Co | Mn | W |
|---|---|---|---|---|
| Comparative Example 1-5 | 90 | 5 | 5 | — |
| Example 3 | 89 | 5 | 5 | 1 |

Figure 7A:
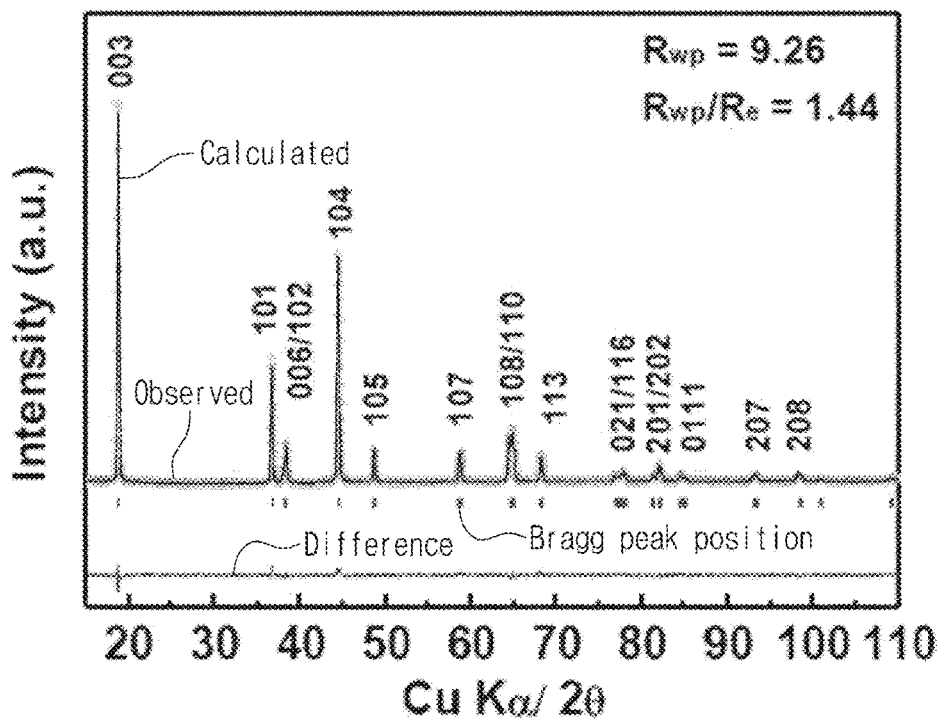
FIGS. 7A to 7C are graphs illustrating XRD results of positive active materials according to Examples 1-5-1 and 1-5-2, and Comparative Example 1-5 of the present invention.
Figure 7B:
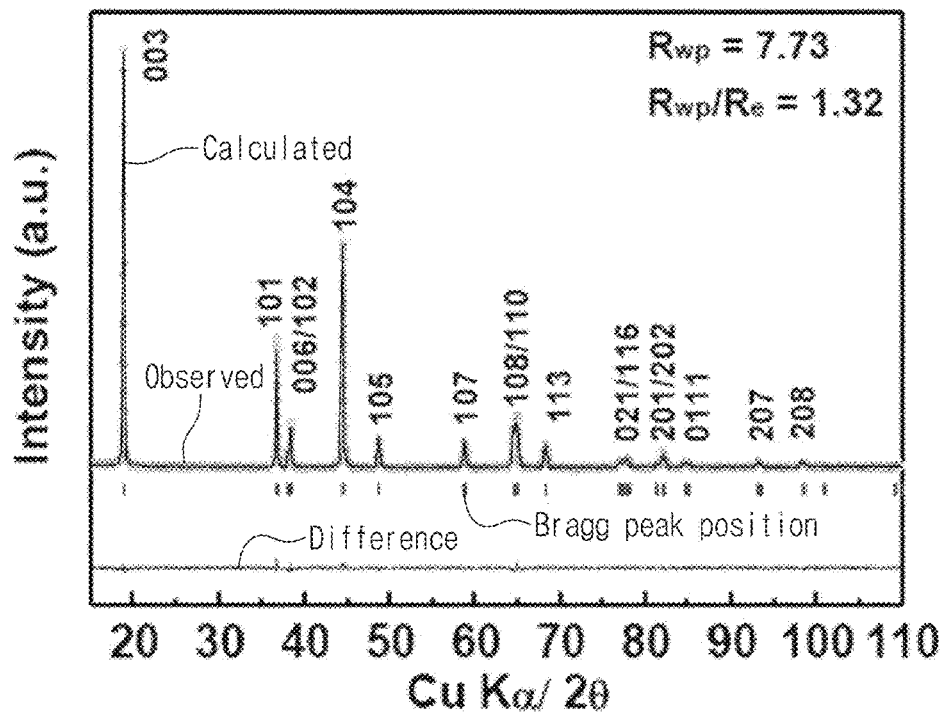
Figure 7C:
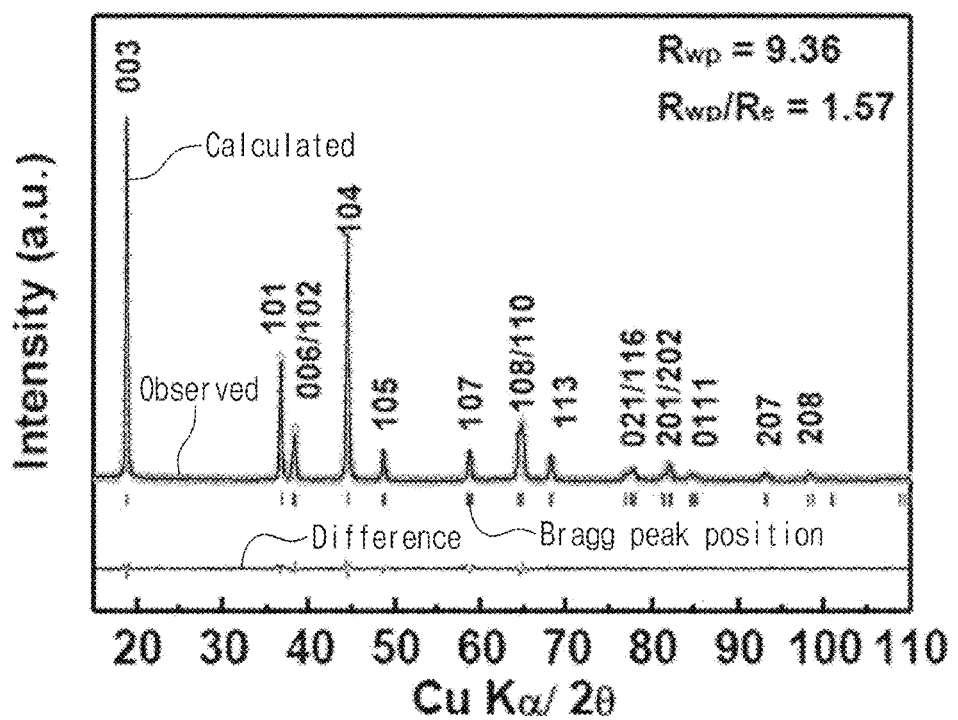

FIG. 7 is a graph illustrating XRD results of positive active materials according to Examples 1-5-1 and 1-5-2, and Comparative Example 1-5 of the present invention. Referring to FIG. 7A to 7C, XRD results of positive active materials according to Comparative Example 1-5, Examples 1-5-1 and 1-5-2 of the present invention were measured. FIGS. 7A to 7C are the graphs illustrating XRD results of the positive active materials according to Comparative Example 1-5 and Examples 1-5-1 and 1-5-2 of the present invention, respectively.

As can be seen in FIG. 7, in the positive active material according to Comparative Example 1-5, a clear peak separation is observed in (006)/(002) and (108)/(110) reflection, so that the positive active material according to Comparative Example 1-5 has high crystallinity and a rhombohedral crystal structure corresponding to a space group of $R_3^-m$. It can be seen that the positive active materials according to Examples 1-5-1 and 1-5-2 have substantially no impurity phase and have a $R_3^-m$ structure.

Lattice constants and unit cell volumes of the positive active material according to Comparative Example 1-5 and the positive active material according to Examples 1-5-1 and 1-5-2 are represented in Table 4 below. It can be seen that even though an ion radius of boron is small, a lattice constant increases according to an increase in the amount of boron doped. Further, it can be seen that a volume of a unit cell gradually increases according to a doping concentration of boron.

TABLE 4

|  | a-axis (Å) | c-axis (Å) | Volume (Å) |
| --- | --- | --- | --- |
| Comparative Example 1-5 | 2.8740 | 14.1997 | 101.577 |
| Example 1-5-1 | 2.8751 | 14.2020 | 101.672 |
| Example 1-5-2 | 2.8764 | 14.2049 | 101.779 |

Figure 8:
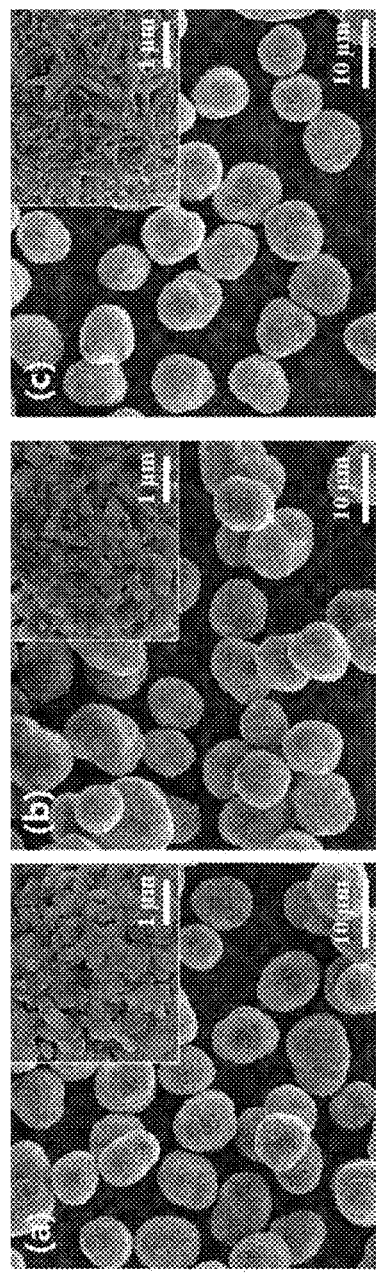
FIG. 8 is a Scanning Electron Microscope (SEM) picture of the positive active materials according to Comparative Example 1-5 and Examples 1-5-1 and 1-5-2 of the present invention.
Figure 9:
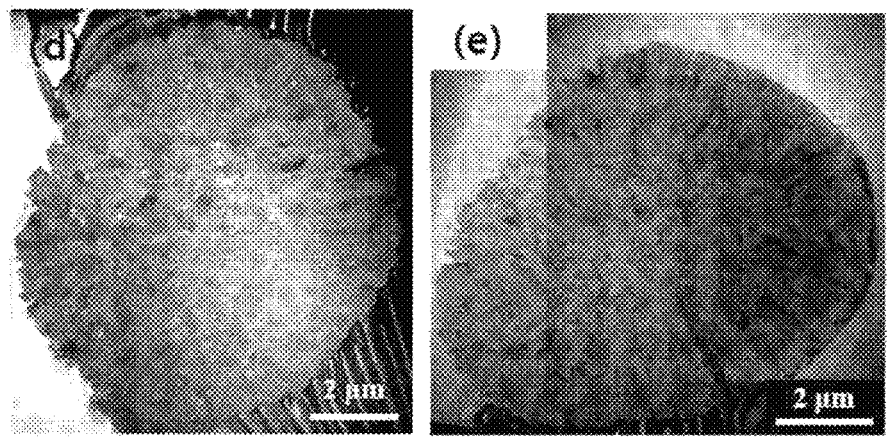
FIG. 9 is a Scanning Transmission Electron Microscope (STEM) picture of the positive active materials according to Comparative Example 1-5 and Examples 1-5-2 of the present invention.
Figure 10:
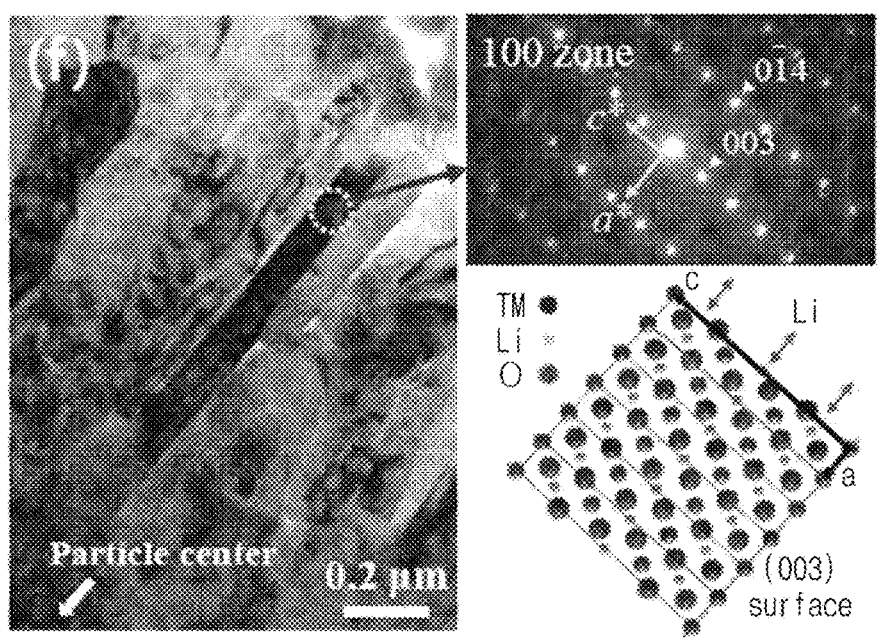
FIG. 10 is an enlarged TEM picture and a diagram for describing an ED pattern and a crystal structure of the positive active material according to Example 1-5-2 of the present invention.

FIG. 8 is a Scanning Electron Microscope (SEM) picture of the positive active materials according to Comparative Example 1-5 and Examples 1-5-1 and 1-5-2 of the present invention, FIG. 9 is a Scanning Transmission Electron Microscope (STEM) picture of the positive active materials according to Comparative Example 1-5 and Examples 1-5-2 of the present invention, and FIG. 10 is an enlarged TEM picture and a diagram for describing an ED pattern and a crystal structure of the positive active material according to Example 1-5-2 of the present invention. Referring to FIGS. 8 to 10, (a) to (c) of FIG. 8 are SEM pictures of the positive active material according to Comparative Example 1-5 and Examples 1-5-1 and 1-5-2, respectively, and (d) and (e) of FIG. 9 are STEM pictures of the positive active material according to Comparative Example 1-5 and Example 1-5-2, respectively.

As can be seen in FIG. 9, it can be seen that the positive active material has the form of the secondary particle in which the plurality of primary particles having the rod shape is agglomerated, and an aspect ratio and arrangement of the primary particles are improved according to the boron doping. An aspect ratio of the primary particle of the positive active material according to Comparative Example 1-5 was 2.0 and an average length was 0.55 μm, an aspect ratio of the primary particle of the positive active material according to Example 1-5-1 was 4.1 and an average length was 1.0 μm, and an aspect ratio of the primary particle of the positive active material according to Example 1-5-2 was 9.0 and an average length was 1.1 μm, which were calculated through the TEM pictures. That is, it can be seen that the aspect ratio and the average length of the primary particle considerably increase according to the doping of boron.

TABLE 5

|  | Aspect ratio | Average length (μm) |
| --- | --- | --- |
| Comparative Example 1-5 | 2.0 | 0.55 |
| Example 1-5-1 | 4.1 | 1.0 |
| Example 1-5-2 | 9.0 | 1.1 |

Figure 11:
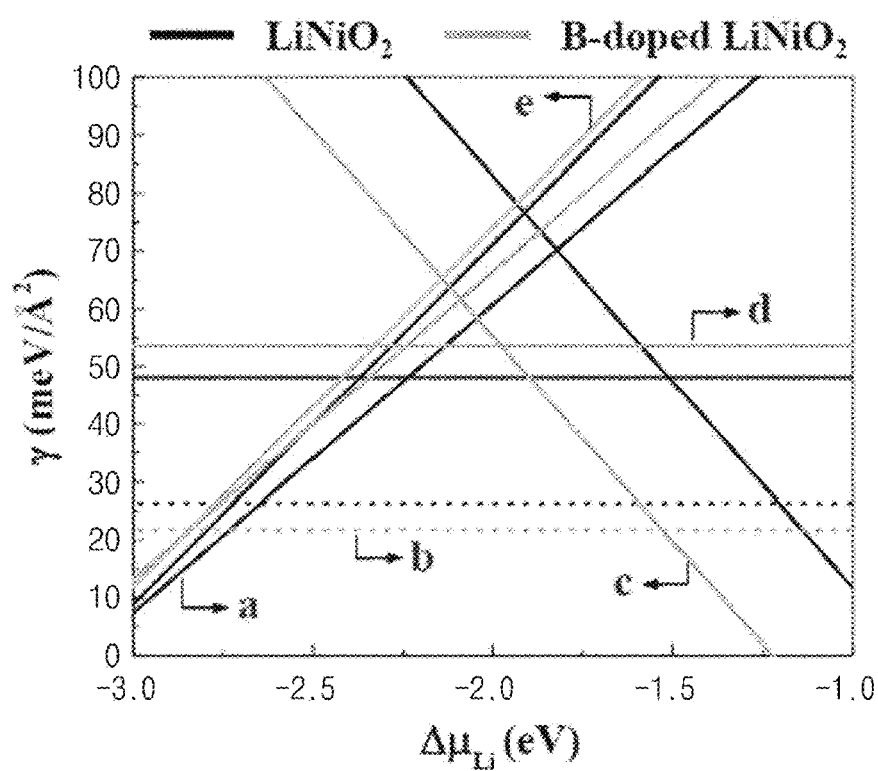
FIG. 11 is a graph for describing surface energy of the positive active material doped with boron according to the Examples of the present invention.
Figure 12:
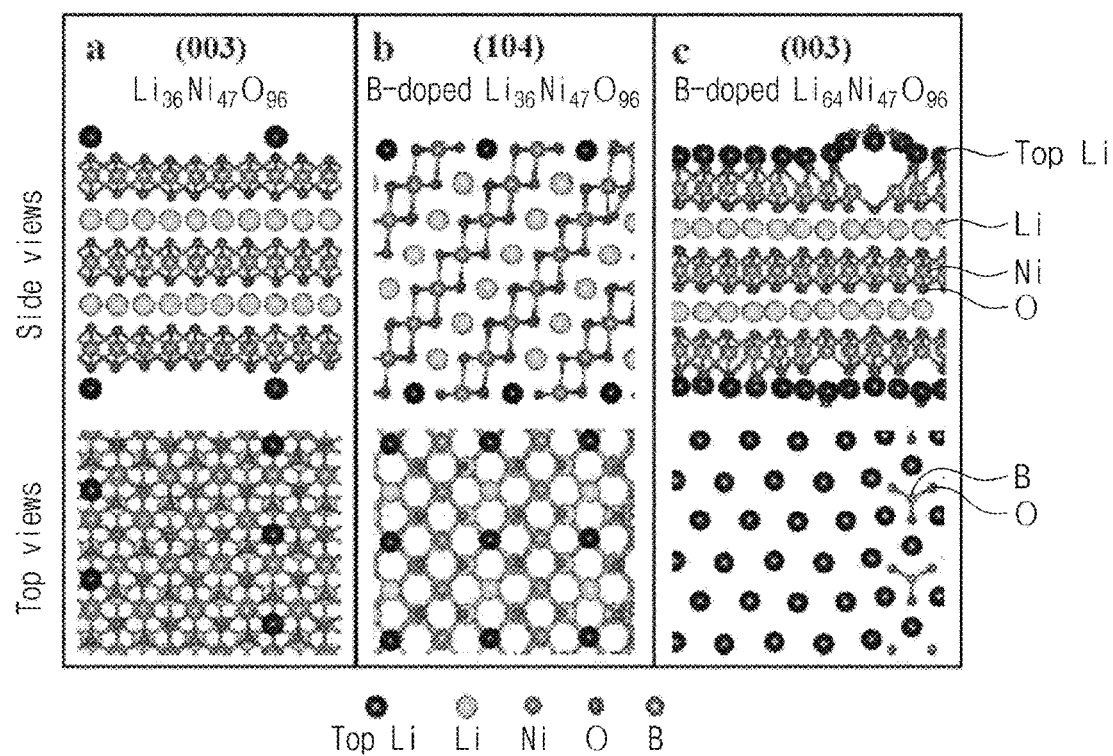
FIGS. 12 to 15 are diagrams illustrating a structural model of the positive active material doped with boron according to the Examples of the present invention.
Figure 13:
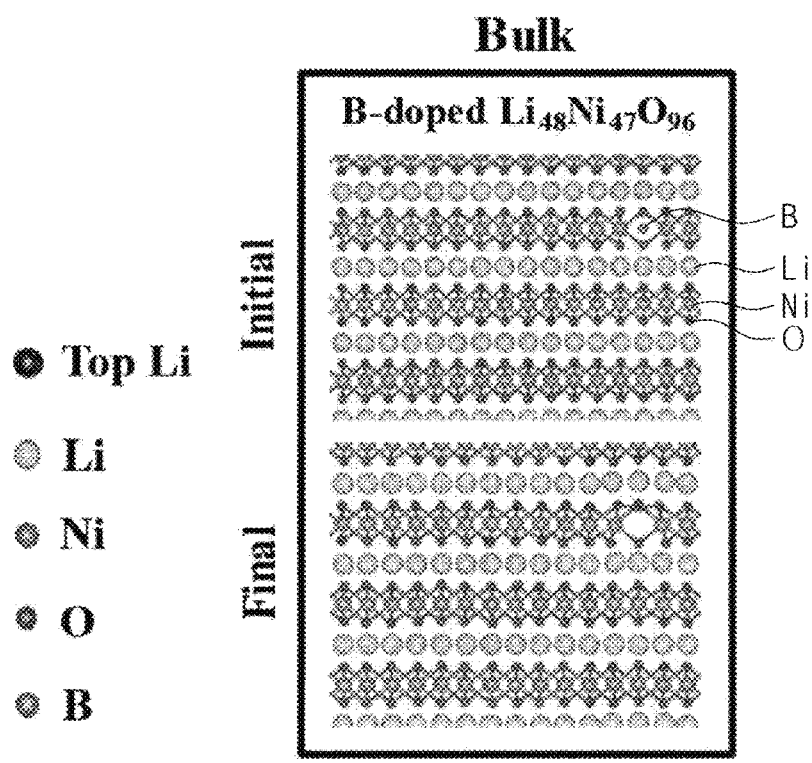
Figure 14:
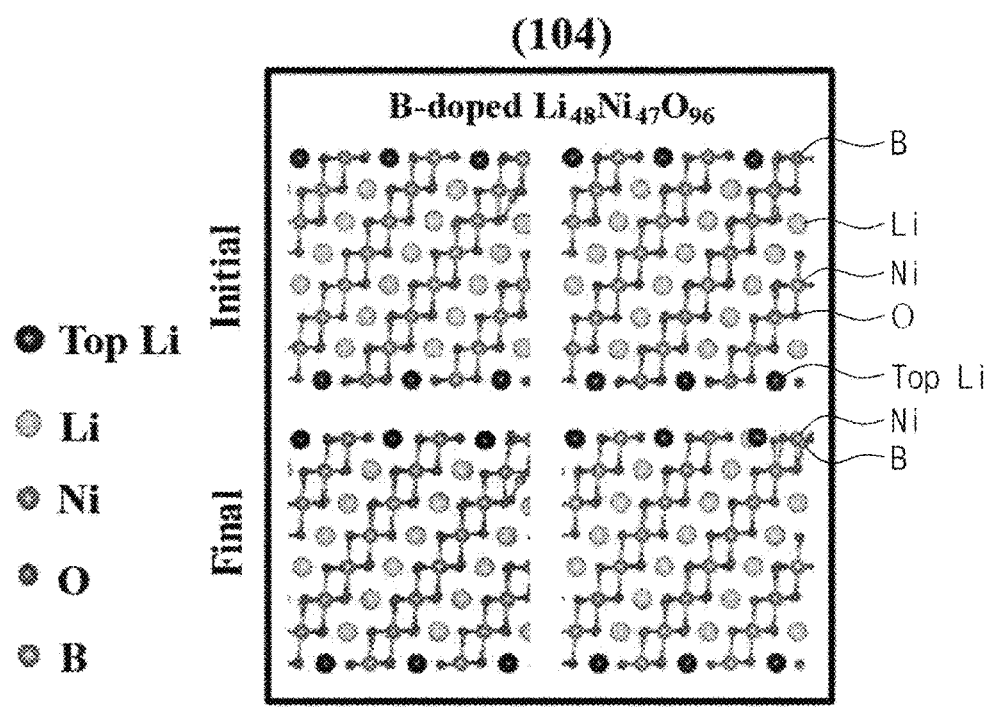
Figure 15:
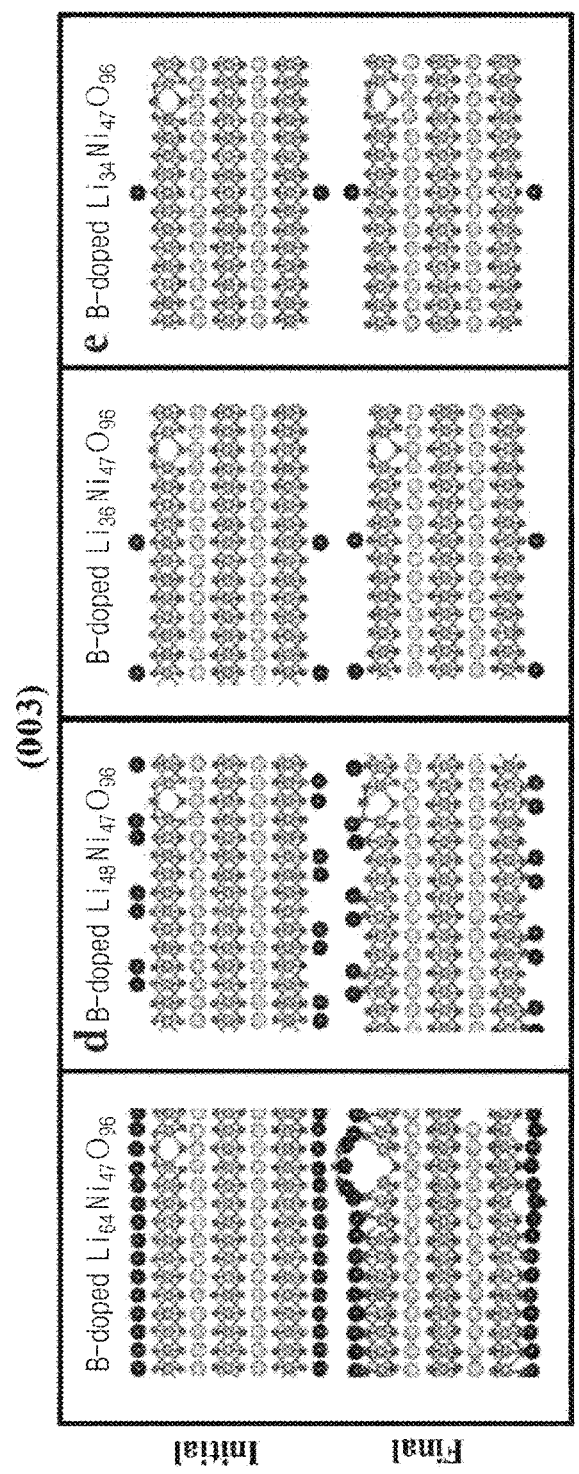

Referring to FIG. 10, it can be seen that the a-axis of the primary particle is substantially parallel to the radius direction of the secondary particle, and each of the surfaces of the layers including Li ions of the primary particles heads the center of the secondary particle. An electron diffraction of the primary particles around the secondary particle indexed with 100 region of $R_3^-m$ is shown and [h00] direction heads the center of the secondary particle. As illustrated in FIG. 10, the Li plane may be substantially parallel to the direction from the center to the surface of the particle. FIG. 11 is a graph for describing surface energy of the positive active material doped with boron according to Examples of the present invention, and FIGS. 12 to 15 are diagrams illustrating a structural model of the positive active material doped with boron according to the Examples of the present invention.

Referring to FIGS. 11 to 15, a crystallographic structure observed in the positive active material doped with boron may be derived according to surface energy reforming of the primary particle and a change in a shape of the primary particle according to the surface energy reforming. That is, crystal morphology may be generally determined by a relative size of surface energy. For example, a spherical crystal structure is formed by isotropic surface energy, a surface having high energy is mainly removed during crystal growth by anisotropic surface energy, and a final crystal shape may be determined by relative orientation of a surface of the remaining low energy.

In the $LiCoO_2$ and $LiNiO_2$ crystals, (003) and (104) surfaces may have lowest surface energy, and for example, a flat hexagonal plate (especially, in an oxidizing environment) prefers (003) surface and the (003) surface may be dominantly formed. In the meantime, according to an increase in the contribution of the (104) surface, the crystal structure may be changed from the flat plate to a cube shape. According to the exemplary embodiment of the present invention, the primary particle of the positive active material in which boron is not doped mainly includes the (104) surface as the surface, but the primary particle of the positive active material in which boron is doped may include the (003) surface having a relative large area.

DFT was used for calculating energy of the (003) and (104) surfaces in $LiNiO_2$ and boron-doped $LiNiO_2$, and the amount of Ni in the positive active material including Ni of 90 mol % is similar to the amount of Ni in $LiNiO_2$, and even though Ni is substituted with Mn by 10%, the surface energy of the (003) surface is not substantially changed, so that $LiNiO_2$ was used as a model structure for simplifying the calculation.

Further, in addition to the stoichiometric (003) side, the Li-poor and Li-rich surfaces in the $LiNiO_2$ particle were found to exists on the surface, so that a non-stoichiometric (003) surface was also considered.

According to the DFT calculation, it is represented that an Ni site is a position advantageous to boron doping (FIG. 15), which is because B moves to the O layer combined with three O negative ions.

FIG. 11 represents surface energy plot $\gamma(\text{Å}\mu_{Li})$ of the (003) and (104) surfaces of LiNiO$_2$ in which boron is not doped and boron-doped LiNiO$_2$ as a function of chemical potential ($\Delta\mu_{Li}$) of Li to bulk metal Li. A small (large) value of ($\text{Å}\mu_{Li}$) represents an environment in which Li is poor (rich), and the case where ($\Delta\mu_{Li}$) is 0 represents that the lithium metal is reserved. A horizontal line and an inclined line of FIG. 11 are the values of $\gamma(\text{Å}\mu_{Li})$ calculated to the stoichiometric surface and the non-stoichiometric surface, respectively. The surface energy in the stoichiometric surface is constant, which is because the value of $\gamma(\text{Å}\mu_{Li})$ is independent to $\text{Å}\mu_{Li}$ in the stoichiometric surface because the number of Ni is the same as the number of Li ($N_{Ni}=N_{Li}$). However, the value of $\gamma(\text{Å}\mu_{Li})$ is dependent to $\text{Å}\mu_{Li}$ in the non-stoichiometric surface ($N_{Ni} \neq N_{Li}$). In the Li poor (rich) surface in which the number of Ni is larger (smaller) than the number of Li, the value of $\gamma(\text{Å}\mu_{Li})$ has a positive (negative) gradient. In the chemical potential value in which Li is poor as $\text{Å}\mu_{Li} \leq -2.73$ eV, in the non-stoichiometric bare LiNiO$_2$, the (003) surface is very advantageous to the surface, in the boron-doped stoichiometric LiNiO$_2$, in which $-2.73$ eV$\leq \text{Å}\mu_{Li} \leq -1.53$ eV, the (104) surface is stable as the surface. However, in the case of $-1.53$ eV$\geq \text{Å}\mu_{Li}$, that is, boron-doped stoichiometric LiNiO$_2$ in which Li is rich, the (003) surface has the most advantageous structure as the surface. In $-1.53$ eV$\geq \text{Å}\mu_{Li}$, the structure by the DFT calculation presents the formation of the well-aligned surface in the lithium boron oxide structure. In an initial structure, a B dopant is located in the second layer, but moves to the topmost layer (of the Li layer) according to the stabilization of the structure. Further, the B dopant pulls and moves O negative ions from the second layer to the topmost layer, and in order to provide a sufficient space to the O negative ions, the Li surface is locally bent. In model c, an average combination length between B and O is 1.384, and the theoretical calculation shows that the (003) surface is stabilized in the surface in which LiNiO$_2$, particularly, Li is rich.

According to the Example, when lithiumization with a hydroxide precursor containing 90 mol % of Ni is performed by enriched Li, Li may be rich on the surface of the boron-doped particle and energy of (003) surface may be preferentially decreased by the B atom. Accordingly, the plurality of primary particles having developed (003) surface may be provided.

Figure 16:
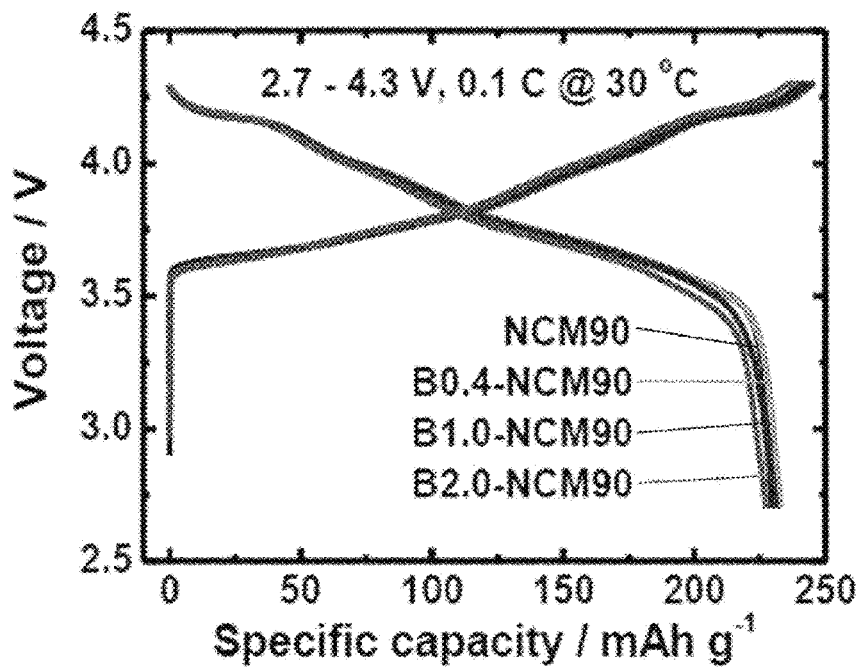
FIG. 16 is a graph illustrating capacity characteristics of lithium secondary batteries including positive active materials according to Comparative Example 1-5 and Examples 1-5-1 to 1-5-3 of the present invention measured at 30° C.
Figure 17:
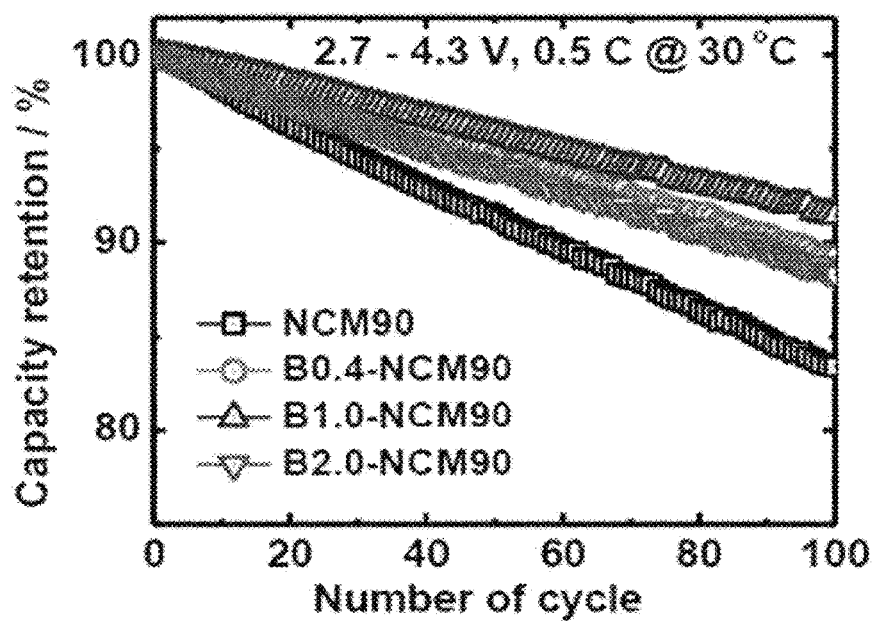
FIG. 17 is a graph illustrating life-span characteristics of lithium secondary batteries including the positive active materials according to Comparative Example 1-5 and Examples 1-5-1 to 1-5-3 of the present invention measured at 30° C.
Figure 18:
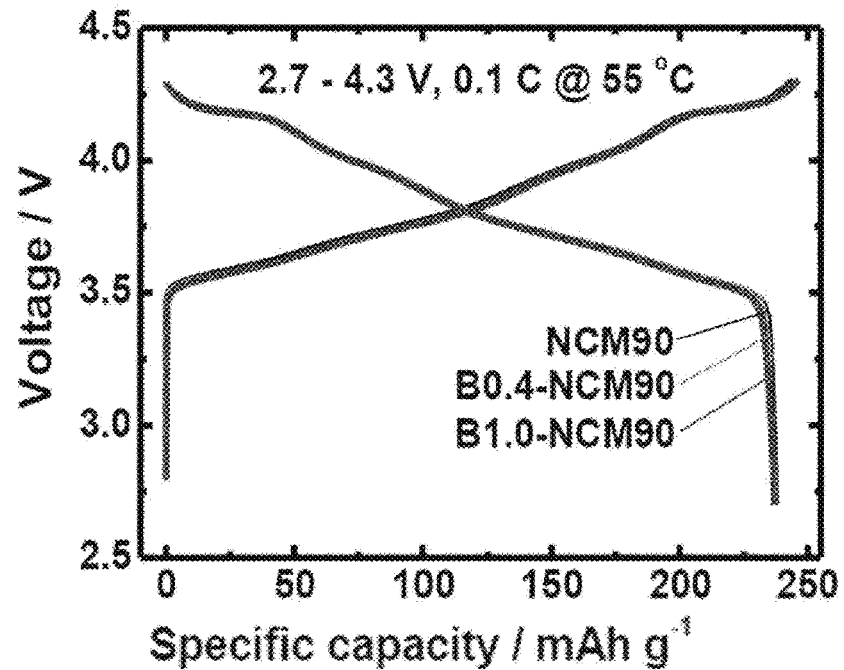
FIG. 18 is a graph illustrating capacity characteristics of lithium secondary batteries including the positive active materials according to Comparative Example 1-5 and Examples 1-5-1 and 1-5-2 of the present invention measured at 55° C.
Figure 19:
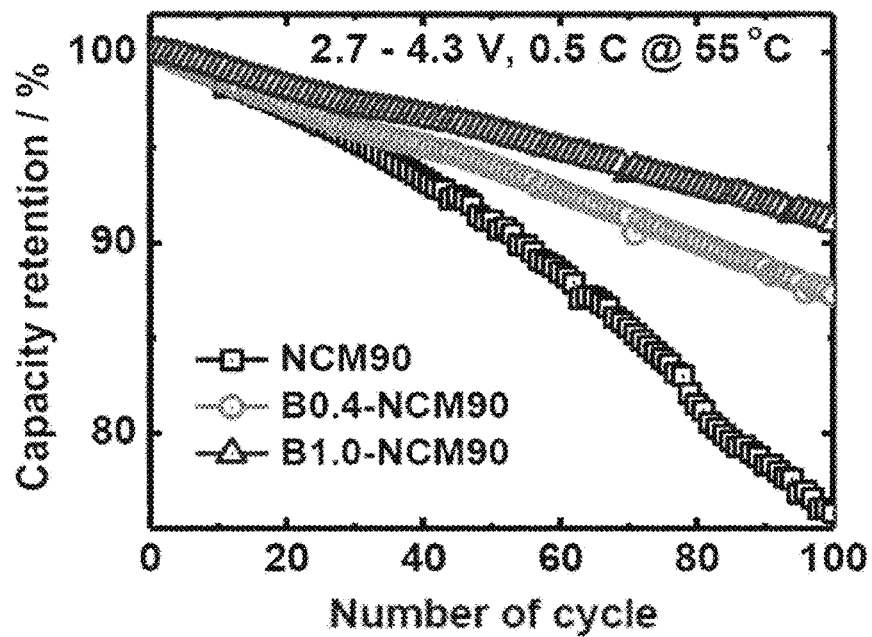
FIG. 19 is a graph illustrating life-span characteristics of the lithium secondary batteries including the positive active materials according to Comparative Example 1-5 and Examples 1-5-1 and 1-5-2 of the present invention measured at 55° C.

FIG. 16 is a graph illustrating capacity characteristics of lithium secondary batteries including positive active materials according to Comparative Example 1-5 and Examples 1-5-1 to 1-5-3 of the present invention measured at 30° C., FIG. 17 is a graph illustrating life-span characteristics of lithium secondary batteries including the positive active materials according to Comparative Example 1-5 and Examples 1-5-1 to 1-5-3 of the present invention measured at 30° C., FIG. 18 is a graph illustrating capacity characteristics of lithium secondary batteries including the positive active materials according to Comparative Example 1-5 and Examples 1-5-1 and 1-5-2 of the present invention measured at 55° C., and FIG. 19 is a graph illustrating life-span characteristics of the lithium secondary batteries including the positive active materials according to Comparative Example 1-5 and Examples 1-5-1 and 1-5-2 of the present invention measured at 55° C.

Referring to FIGS. 16 to 19, half cells were manufactured by using the positive active materials according to Comparative Example 1-5, and Examples 1-5-1 to 1-5-3, a discharge capacity was measured under the condition of cut off 2.7 to 4.3V, 0.1 C, and temperatures of 30° C. and 50° C., and a capacity change according to the number of times of the charge/discharge cycle was measured under the condition of cut off 2.7 to 4.3V, 0.5 C, and temperatures of 30° C. and 50° C.

In the drawing, NCM90 means the positive active material according to Comparative Example 1-5, B0.4-NCM90 means the positive active material according to Example 1-5-1, B1.0-NCM90 means the positive active material according to Example 1-5-2, and B2.0-NCM90 means the positive active material according to Example 1-5-3.

As can be seen in FIGS. 16 and 17, it can be seen that according to the performance of the charge/discharge process, the capacity of the lithium secondary battery including the positive active material according to Comparative Example 1-5 was considerably decreased, but the decrease in the capacity of the lithium secondary batteries including the positive active materials according to Example 1-5-1 to 1-5-3 was not relatively large. That is, it can be seen that the manufacturing of the lithium secondary battery by using the positive active material doped with boron is the effective method of improving a life-span characteristic.

Further, it can be seen that when the amount of boron doped in the positive active material is 2.0 mol % or more, the life-span characteristic is decreased again. That is, it can be seen that the control of the amount of boron doped to be less than 2.0 mol % is the effective method of improving the life-span characteristic of the lithium secondary battery using the high-nickel positive active material.

Further, it can be seen that when the charge/discharge is performed at 55° C. that is a relatively high temperature compared to the case where the capacity is measured at 30° C., the capacity of the lithium secondary battery including the positive active material in which boron is not doped according to Comparative Example 1-5 is sharply decreased, but when boron is doped according to the Example, the life-span shortening characteristic is remarkably decreased.

Figure 20A:
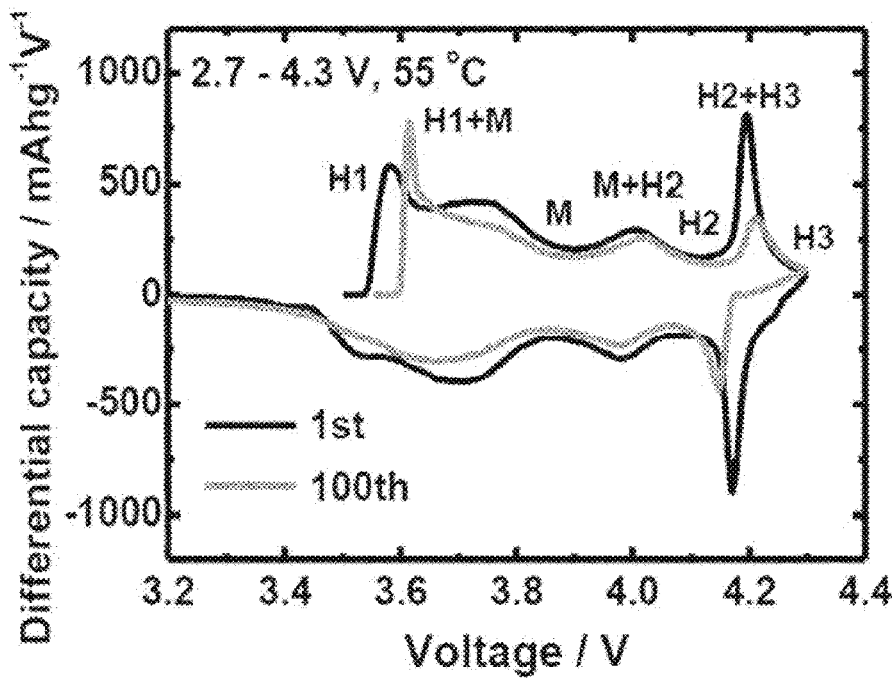
FIGS. 20A and 20B are graphs illustrating differential capacities of the lithium secondary batteries including the positive active materials according to Comparative Example 1-5 and Example 1-5-2 of the present invention measured at 55° C.
Figure 20B:
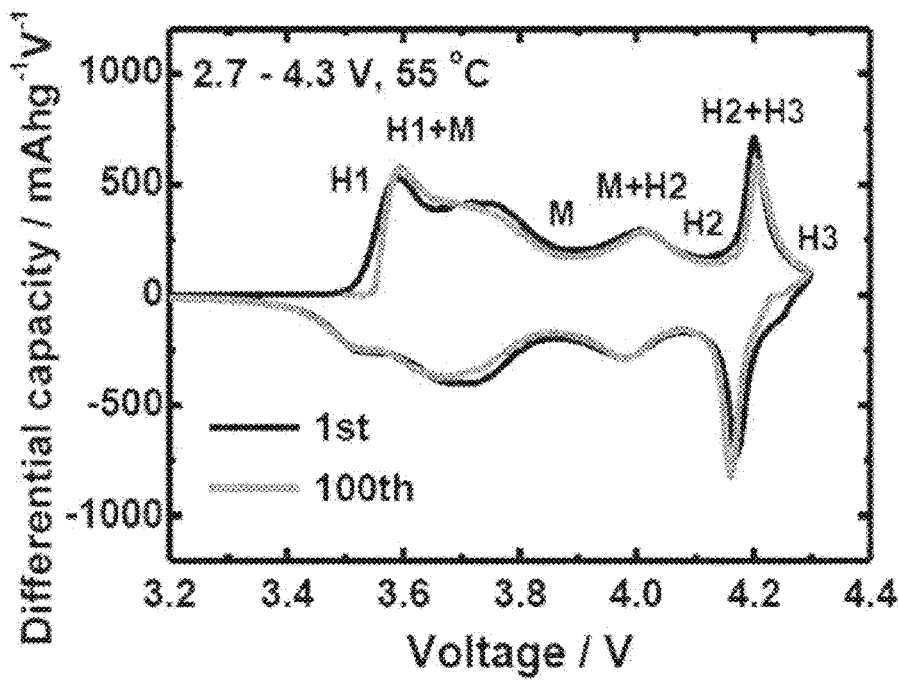
Figure 21A:
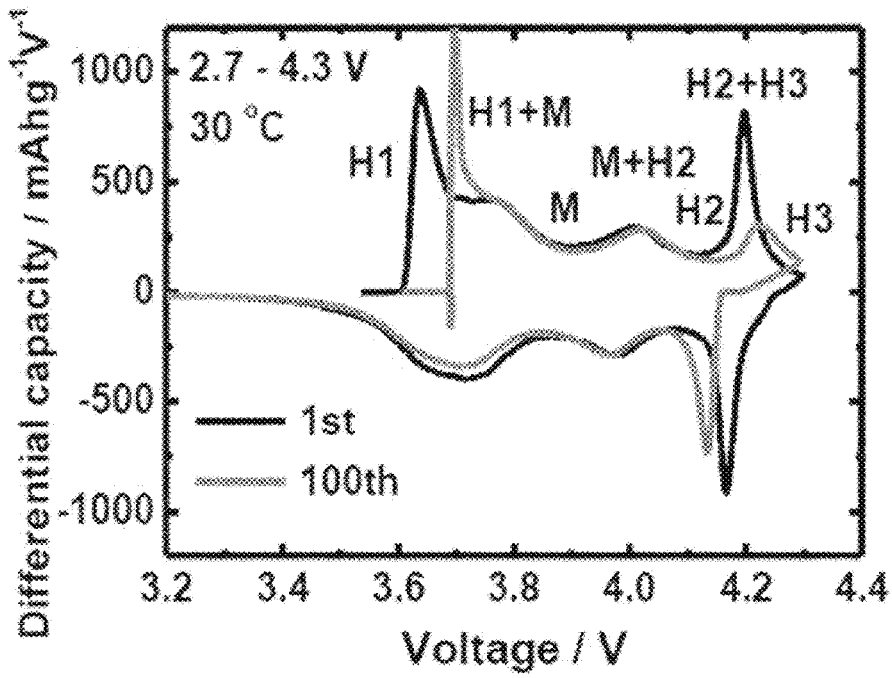
FIGS. 21A, 21B, and 21C are graphs illustrating differential capacities of the lithium secondary batteries including positive active materials according to Comparative Example 1-5 and Examples 1-5-1 and 1-5-2 of the present invention measured at 30° C.
Figure 21B:
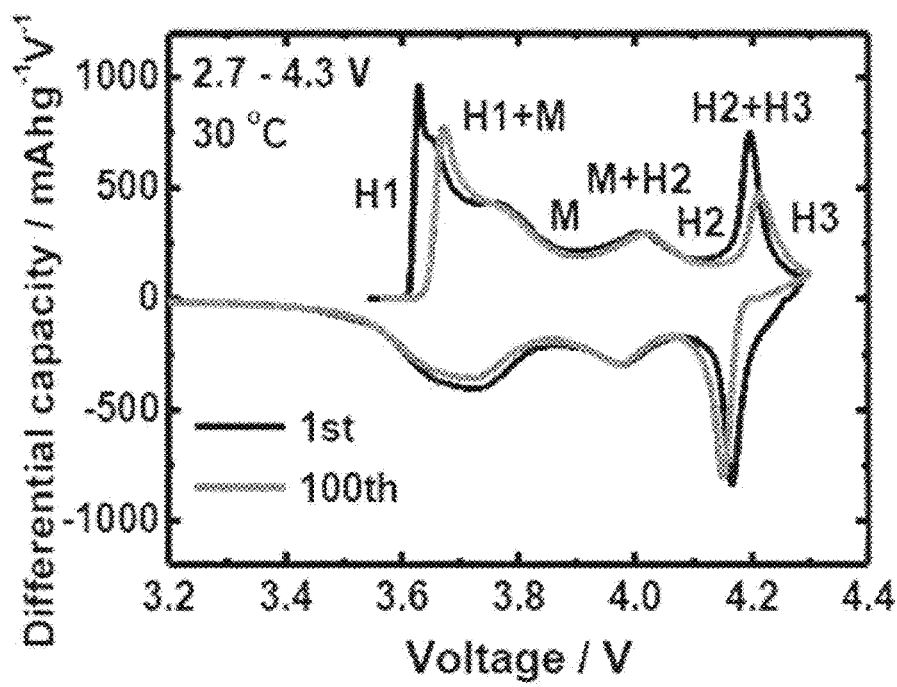
Figure 21C:
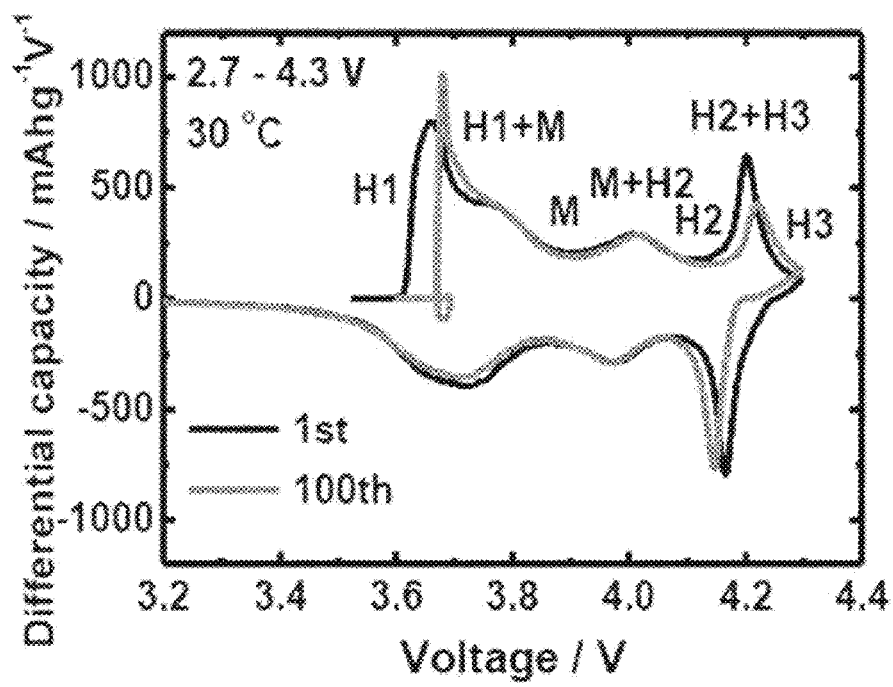

FIGS. 20A and 20B are graphs illustrating differential capacities of the lithium secondary batteries including the positive active materials according to Comparative Example 1-5 and Example 1-5-2 of the present invention measured at 55° C., and FIGS. 21A, 21B, and 21C are graphs illustrating differential capacities of the lithium secondary batteries including the positive active materials according to Comparative Example 1-5 and Examples 1-5-1 and 1-5-2 of the present invention measured at 30° C.

Referring to FIGS. 20 and 21, as described above, half cells were manufactured by using the positive active materials according to Comparative Example 1-5 and Example 1-5-1 and 1-5-2, a differential capacity according to the number of times of the charge/discharge was measured under the condition of cut off 2.7 to 4.3V and temperatures of 30° C. and 55° C. FIGS. 20A and 20B are the differential capacity graphs (the condition of 55° C.) for the positive active materials according to Comparative Example 1-5 and Example 1-5-2, and FIGS. 21A to 21C are differential capacity graphs for the positive active materials according to Comparative Example 1-5 and Examples 1-5-1 and 1-5-2 (the condition of 30° C.).

According to the charge/discharge progresses, it can be seen that the positive active materials according to Examples 1-5-1 and 1-5-2 and Comparative Example 1 sequentially include H1 phase, H1+M phase, M phase, M+H2 phase, H2 phase, H2+H3 phase, H3 phase, H2+H3 phase, M+H2 phase, M phase, H1+M phase, and H1 phase. In FIGS. 20 and 21, the H1 phase represents the crystal structure in which the positive active materials according to the Examples and the Comparative Example have unique lattice constants in the c-axis direction, the H2 phase represents the crystal structure in which the positive active materials according to the Examples and the Comparative Example have lattice constants longer than the unique lattice constants in the c-axis direction, the H3 phase represents the crystal structure in which the positive active materials according to the Examples and the Comparative Example have lattice constants shorter than the unique lattice constants in the c-axis direction, and the M phase represents the monoclinic crystal structure.

In Comparative Example 1-5 in which boron is not doped, as illustrated in FIGS. 20 and 21, it can be seen that according to the increase in the number of times of the charge/discharge, the peak values of the H2 and H3 phases are sharply decreased. The phase transition from H2 to H3 causes the rapid contraction of the unit cell in the c-axis direction to mechanically transform the positive active material, thereby decreasing the life-span characteristic. That is, it can be seen again that in the range of 4.1 to 4.3 V, the integral area rapidly decreases, and as described above, according to Comparative Example 1-5, the capacity rapidly decreases according to the number of times of the charge/discharge.

In the meantime, in the cases according to Examples 1-5-1 and 1-5-2, as illustrated in FIGS. 20 and 21, it can be seen that according to the increase in the number of times of the charge/discharge, the decrease of the peak values of the H2 and H3 phases is relatively small. That is, it can be seen that according to the number of times of the charge/discharge, the amounts of change in the generation rates of the H2 and H3 phases considerably decreases by the boron doping. That is, it can be seen that the change amount of the integral area is decreased in the range of 4.1 to 4.3 V, and as described above, according to the Examples, the decrease in the capacity according to the number of times of the charge/discharge is minimized.

Figure 22:
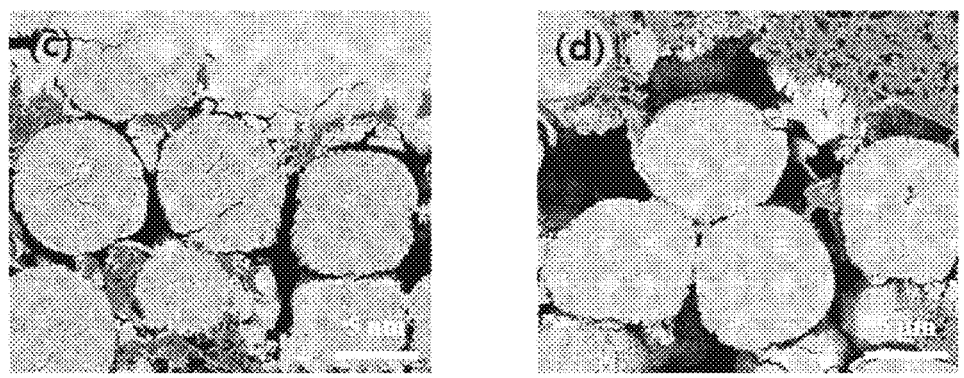
FIG. 22 is a SEM picture of the positive active materials according to Comparative Example 1-5 and Example 1-5-2 of the present invention.

FIG. 22 is a SEM picture of the positive active materials according to Comparative Example 1-5 and Examples 1-5-2 of the present invention.

Referring to FIG. 22, half cells were manufactured by using the positive active materials according to Comparative Example 1-5 and Example 1-5-2, and a SEM picture of the positive active materials was taken after 100 times of the charge/discharge. (c) and (d) of FIG. 22 are SEM pictures of the positive active materials according to Comparative Example 1-5 and Examples 1-5-2 of the present invention.

As can be seen in FIG. 22, many cracks are found from the center portion of the particle of the charged positive active material particle according to Comparative Example 1-5. In the meantime, it can be seen that in the charged positive active material according to Example 1-5-2, the cracks are considerably decreased by the boron doping.

Figure 23:
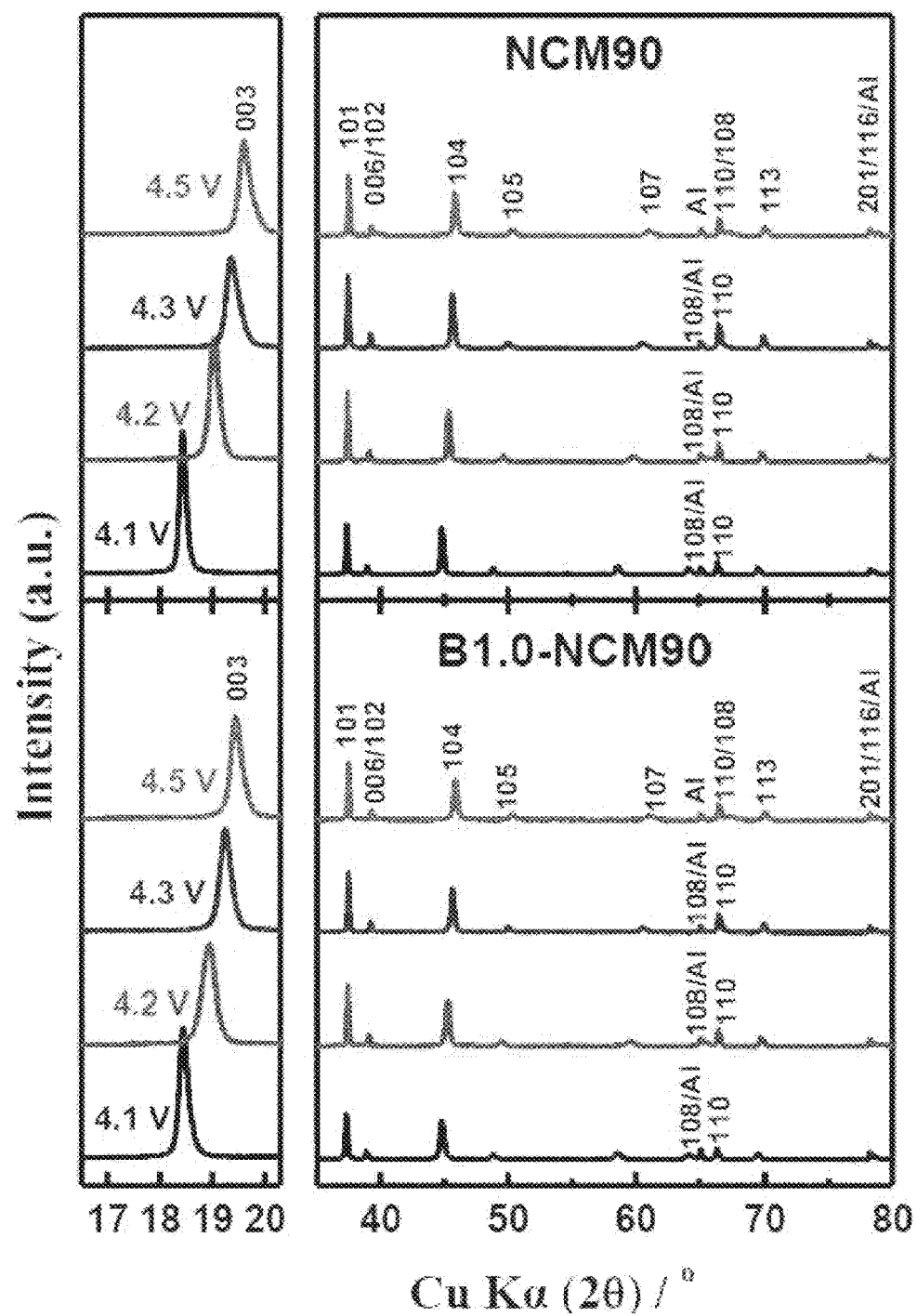
FIG. 23 is a graph illustrating an XRD measurement result after the positive active materials according to Comparative Example 1-5 and Example 1-5-2 of the present invention are charged.
Figure 24:
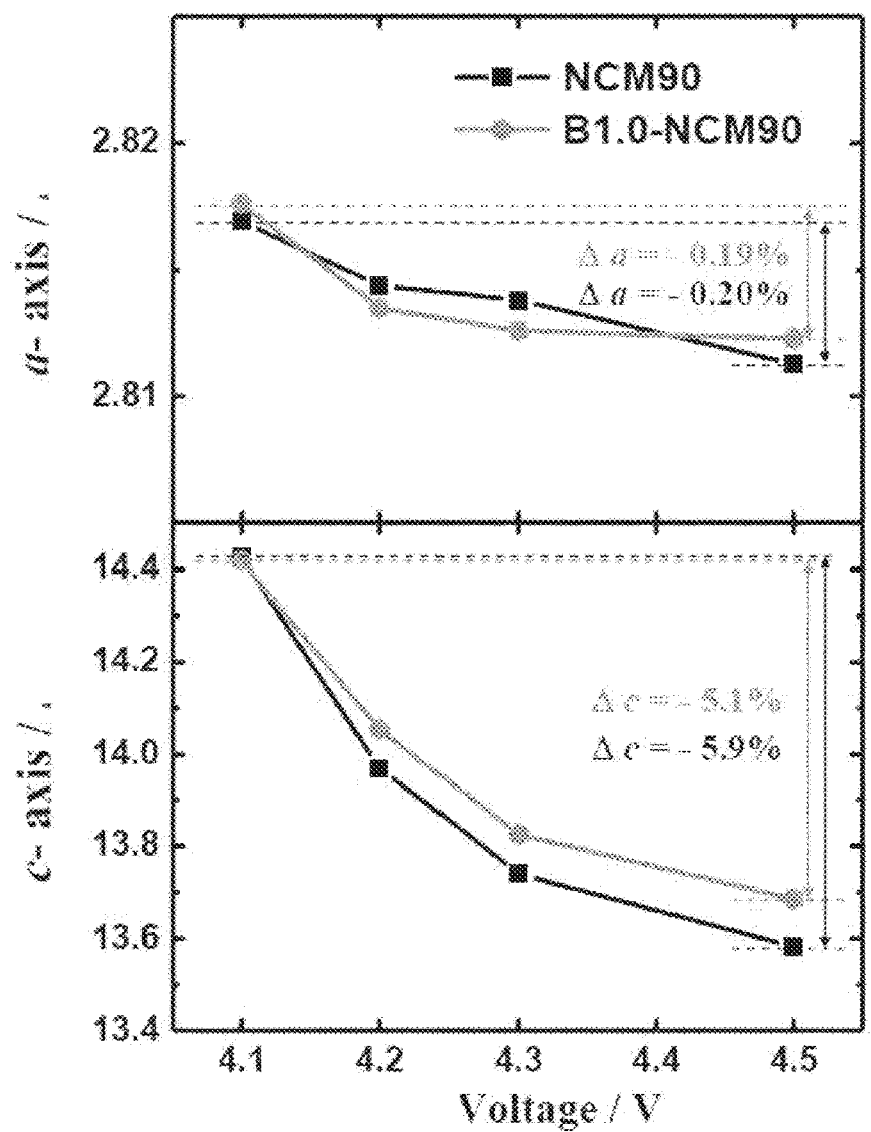
FIG. 24 is a graph for describing a change in an a-axis length and a c-axis length before and after the positive active materials according to Comparative Example 1-5 and Example 1-5-2 of the present invention are charged.

FIG. 23 is a graph illustrating an XRD measurement result after the positive active materials according to Comparative Example 1-5 and Example 1-5-2 of the present invention are charged, and FIG. 24 is a graph for describing a change in an a-axis length and a c-axis length before and after the positive active materials according to Comparative Example 1-5 and Example 1-5-2 of the present invention are charged.

Referring to FIGS. 23 and 24, the microcrack shown in the charge state of the positive active material is generally due to the anisotropic dimensional change of the unit cell, in order to quantify the unit cell, an ex situ XRD measurement was performed on the positive active materials according to Comparative Example 1-5 and Example 1-5-2 in the charge state, and the changes in an a-axis length and a c-axis length before and after the positive active materials according to Comparative Example 1-5 and Example 1-5-2 of the present invention are charged were measured.

In the drawing, NCM90 means the positive active material according to Comparative Example 1-5 and B1.0-NCM90 means the positive active material according to Example 1-5-2.

The c-axis lattice constant was decreased by 5.1% in the case of the positive active material according to Example 1-5-2, and the c-axis lattice constant was decreased by 5.9% in the case of the positive active material according to Comparative Example 1-5. It can be seen that the positive active material according to Example 1-5-2 is decreased compared to the positive active material according to Comparative Example 1-5.

Further, in the case of the primary particle arbitrary oriented in the positive active material according to Comparative Example 1-5, anisotropic stress within the primary particle causes transformation in a boundary between the particles to generate microcrack in the boundary, and finally the primary particle may be separated an electrolyte may permeate into the microcrack within the particle, thereby degrading the positive active material.

In the meantime, in the positive active material according to Example 1-5-2, the primary particles arranged so that the a-axis direction heads the center portion of the secondary particle may be agglomerated, and as a result, the primary particles aligned in the radius direction may uniformly contract the entire secondary particle without the local stress concentration. Accordingly, it is possible to minimize the generation of the microcrack within the secondary particle.

Figure 25:
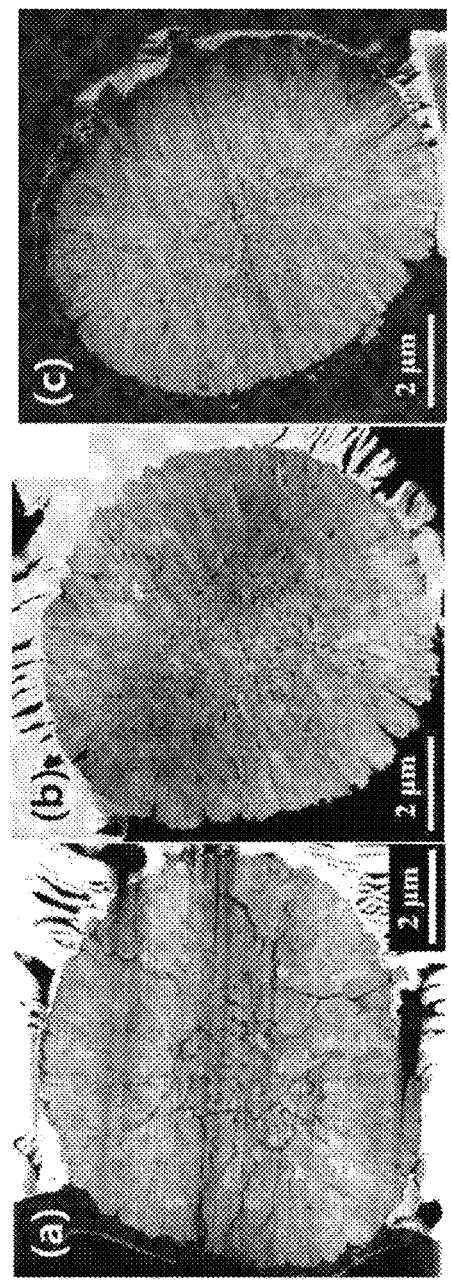
FIG. 25 is a STEM picture of the positive active materials according to Comparative Example 1-5 and Examples 1-5-1 and 1-5-2 of the present invention of which charge/discharge is performed 100 times.
Figure 26:
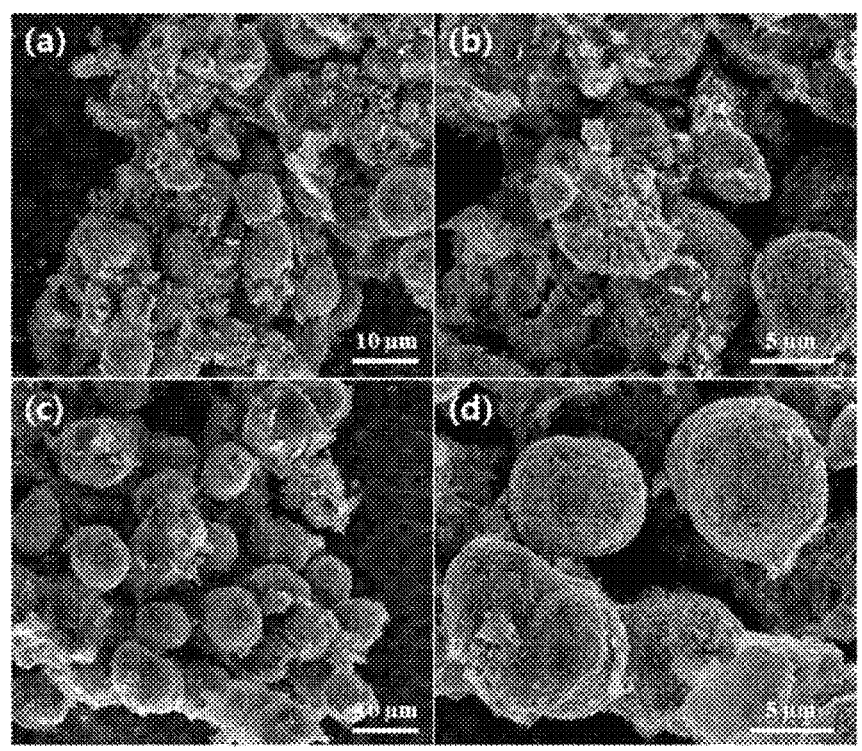
FIG. 26 is a SEM picture of the positive active materials after the lithium secondary batteries including the positive active materials according to Comparative Example 1-5 and Examples 1-5-1 and 1-5-2 of the present invention, of which charge/discharge is performed 100 times, are charged/discharged 100 times.
Figure 27:
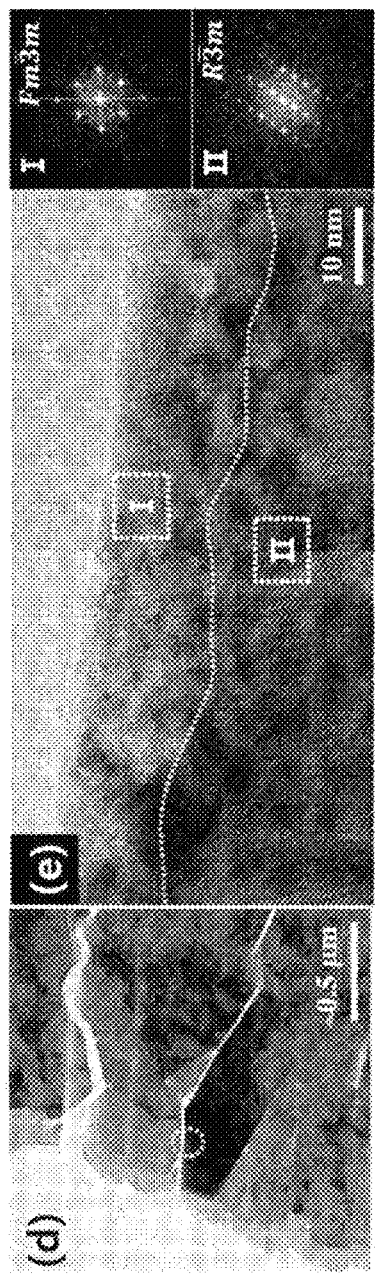
FIG. 27 is an enlarged TEM picture of the positive active material according to Comparative Example 1-5 of which charge/discharge is performed 100 times, and a FFT diagram for zones I and II.
Figure 28A:
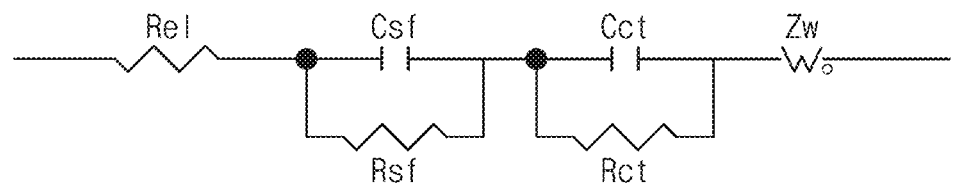
FIGS. 28A, 28B, 28C, and 28D are a diagram illustrating an equivalent circuit of a Nyquist plot, and graphs illustrating a comparison of Rsf and Rct of the positive active materials according to Comparative Example 1-5 and Example 1-5-2.
Figure 28B:
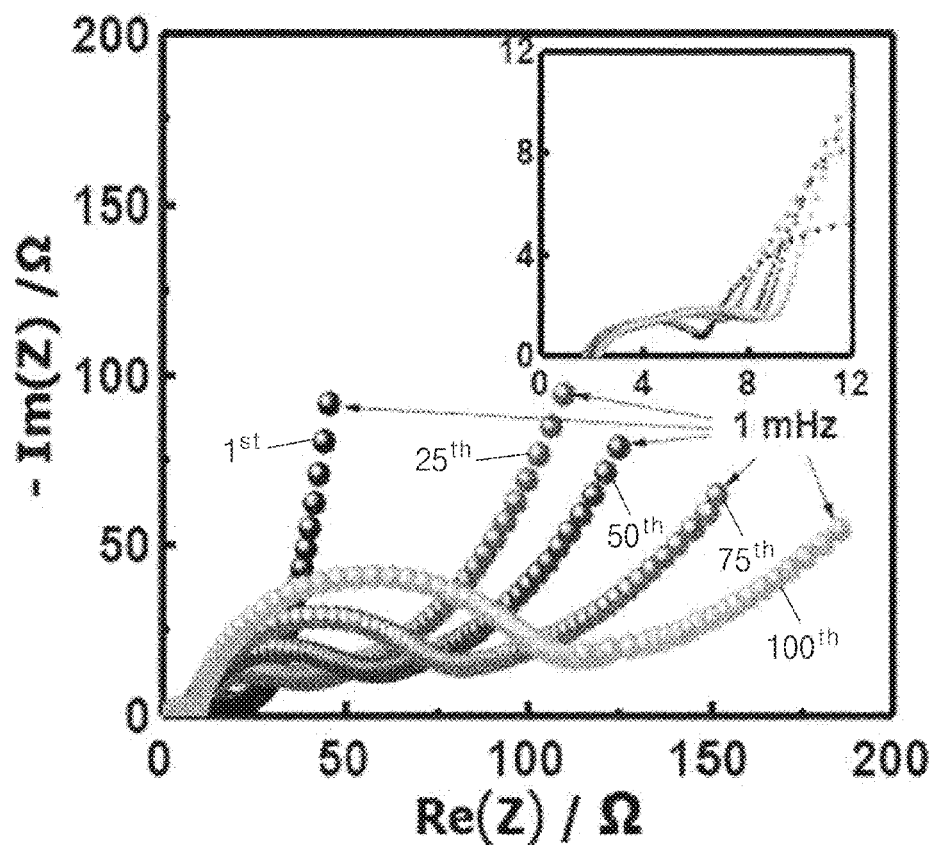
Figure 28C:
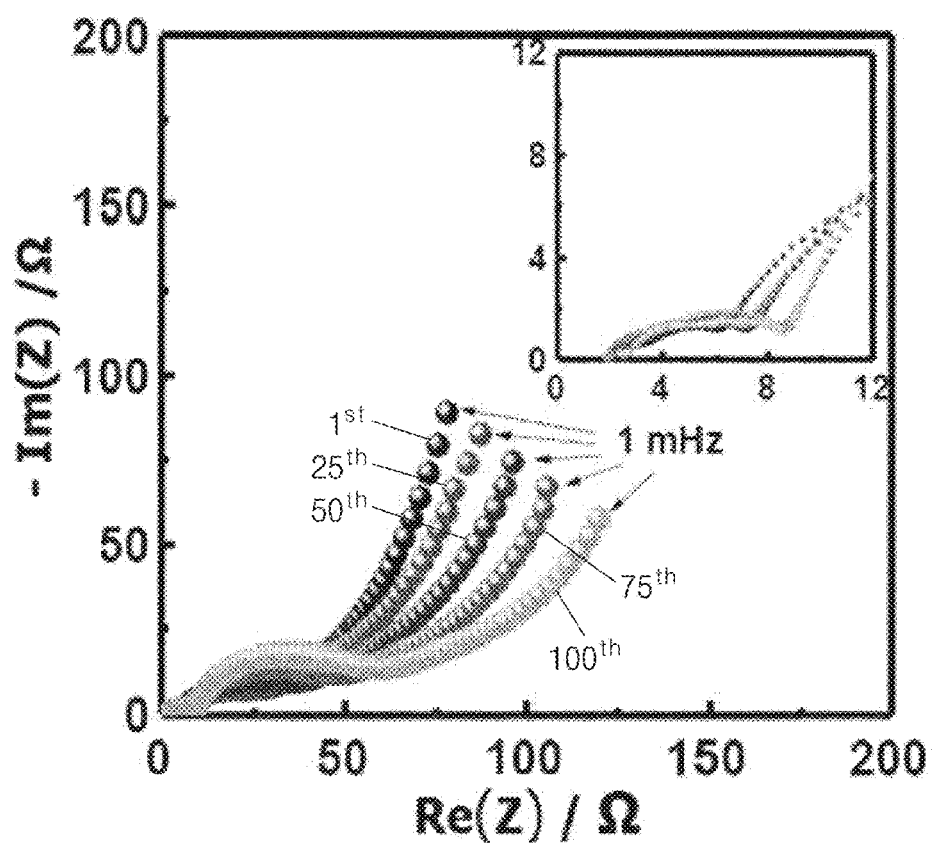
Figure 28D:
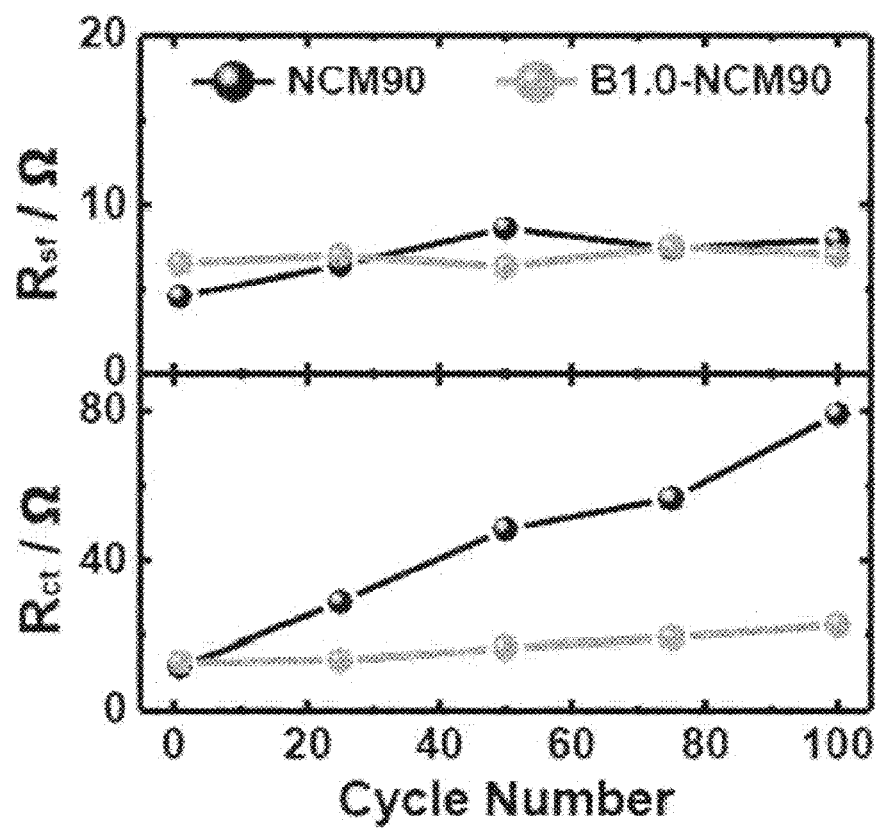

FIG. 25 is a STEM picture of the positive active materials according to Comparative Example 1-5 and Examples 1-5-1 and 1-5-2 of the present invention of which charge/discharge is performed 100 times, FIG. 26 is a SEM picture of the positive active materials after the lithium secondary batteries including the positive active materials according to Comparative Example 1-5 and Examples 1-5-1 and 1-5-2 of the present invention, of which charge/discharge is performed 100 times, are charged/discharged 100 times, and FIG. 27 is an enlarged TEM picture of the positive active material according to Comparative Example 1-5 of which charge/discharge is performed 100 times, and a FFT diagram for zones I and II, and FIGS. 28A, 28B, 28C, and 28D are a diagram illustrating an equivalent circuit of a Nyquist plot, and graphs illustrating a comparison of $R_{sf}$ and $R_{ct}$ of the positive active materials according to Comparative Example 1-5 and Example 1-5-2.

Referring to FIGS. 25 to 27, (a) to (c) of FIG. 25 are STEM pictures of the positive active materials according to Comparative Example 1-5 and Examples 1-5-1 and 1-5-2 of which charge/discharge is performed 100 times at 55° C., respectively, (a) and (b) of FIG. 26 are SEM pictures of the positive active material according to Comparative Example 1-5 of which charge/discharge is performed 100 times at 55° C., (c) and (d) of FIG. 26 are SEM pictures of the positive active material according to Example 1-5-2 of which charge/discharge is performed 100 times at 55° C., and (b) and (c) of FIG. 28 are graphs illustrating the EIS result of the positive active materials according to Comparative Example 1-5 and Example 1-5-2 according to the number of times of the charge/discharge, respectively.

In the drawing, NCM90 means the positive active material according to Comparative Example 1-5, B0.4-NCM90 means the positive active material according to Example 1-5-1, and B1.0-NCM90 means the positive active material according to Example 1-5-2.

The positive active material according to Comparative Example 1-5 of which the charge/discharge is performed includes a network structure of the microcrack which is formed along the interface between the particles and separates the primary particles. As illustrated in FIG. 26, it can be seen that in the positive active material according to Comparative Example 1-5, the plurality of microcracks is generated according to the performance of the charge/discharge, but in the boron-doped positive active material according to Example 1-5-2, the generation of the microcrack according to the performance of the charge/discharge is significantly little.

Further, as described above, the positive active material according to Comparative Example 1-5 includes the primary particle of which the aspect ratio is relatively low, and as a result, the plurality of microcracks may be generated by the contraction and the expansion generated during the charge/discharge process, and the positive active material may be degraded by the parasitic reaction with the electrolyte permeating into the microcrack. That is, as illustrated in FIG. 27, referring to the high magnification TEM image of the region indicated along the interface of the primary particle, it can be seen that a surface layer similar to thick NiO having a thickness of about 10 nm is generated in the crack according to the parasitic reaction with the electrolyte, and a layer structure collapsed due to the mixing of the positive ions by the permeation of the electrolyte to be changed into a rocksalt structure.

Next, referring to FIG. 28, charge movement resistance ($R_{ct}$) of the positive active material according to Comparative Example 1-5 gradually increases from 11.7Ω (the first cycle) to 79.2Ω ($100^{th}$ cycle), but $R_{ct}$ of the positive active material according to Example 1-5-2 increases from 13.1Ω (the first cycle) to 22.6Ω ($100^{th}$ cycle) and thus the increase amount is remarkably small. That is, it can be seen that a resistance increase layer becomes thick inside the positive active material according to Comparative Example 1-5.

Figure 29:
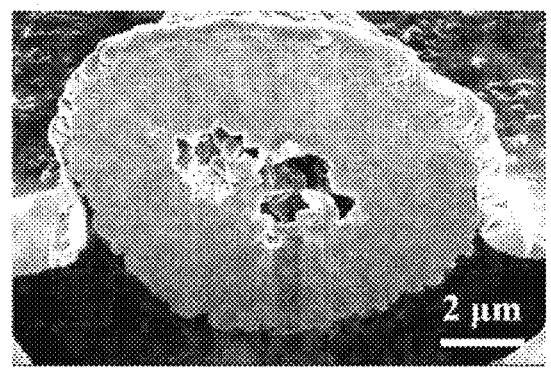
FIG. 29 is SEM pictures of positive active materials according to Comparative Example 1-1 and Example 1-1 of the present invention.
Figure 29:
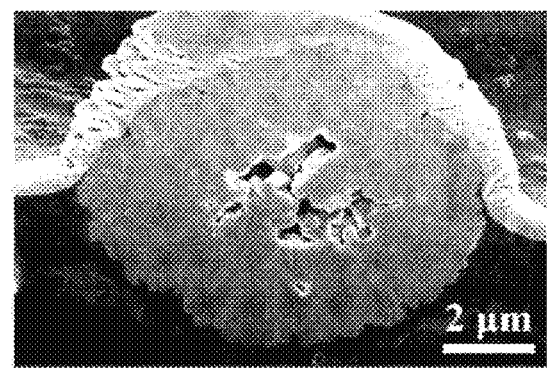
Figure 30:
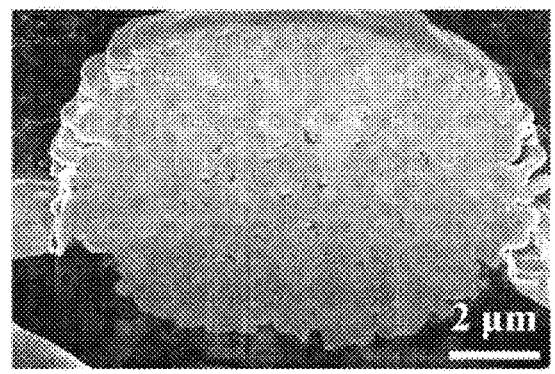
FIG. 30 is SEM pictures of positive active materials according to Comparative Example 1-2 and Example 1-2 of the present invention.
Figure 30:
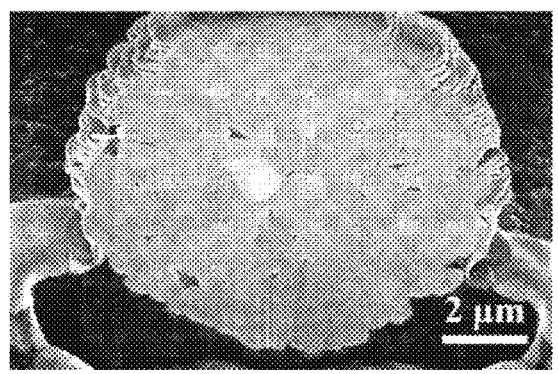
Figure 31:
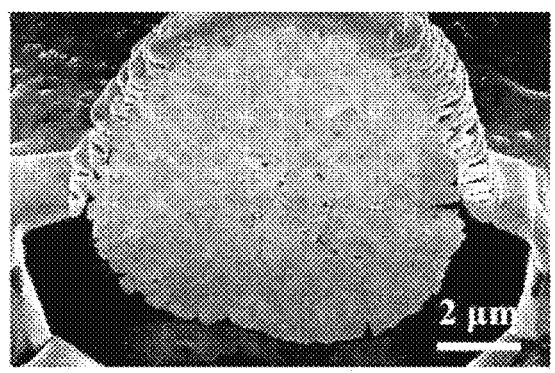
FIG. 31 is SEM pictures of positive active materials according to Comparative Example 1-3 and Example 1-3 of the present invention.
Figure 31:
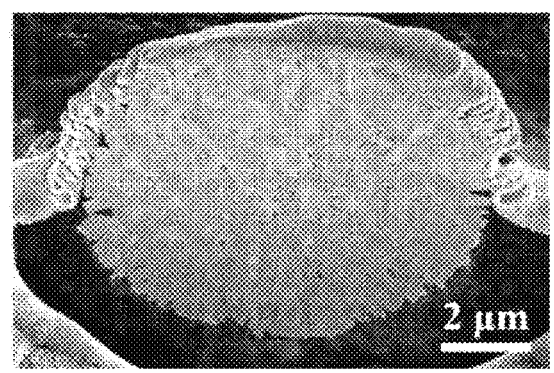
Figure 32:
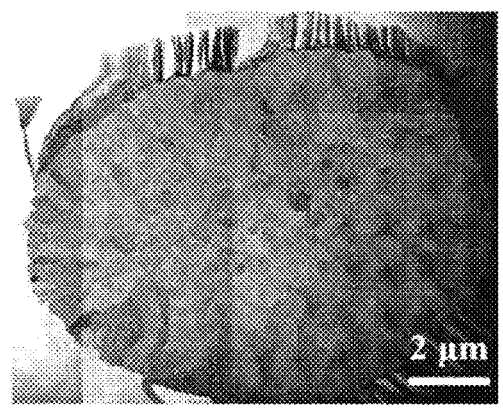
FIG. 32 is TEM pictures of positive active materials according to Comparative Example 1-4 and Example 1-4-1 of the present invention.
Figure 32:
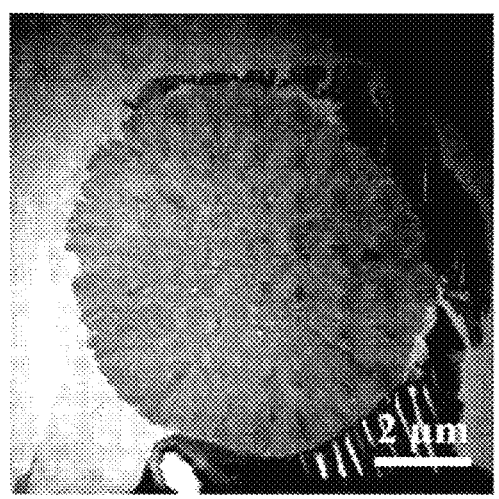
Figure 33:
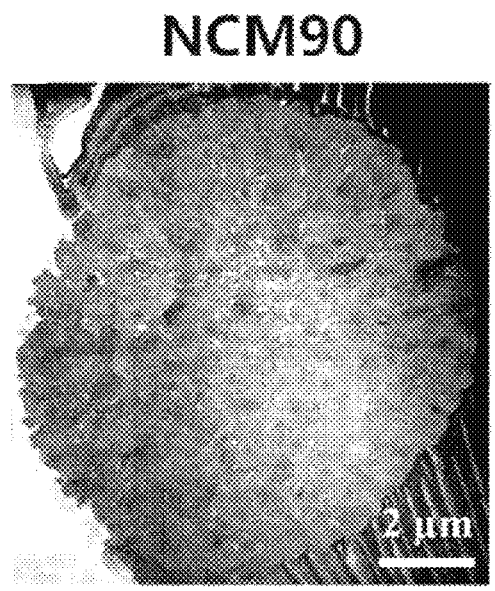
FIG. 33 is TEM pictures of positive active materials according to Comparative Example 1-5 and Example 1-5-2 of the present invention.
Figure 33:
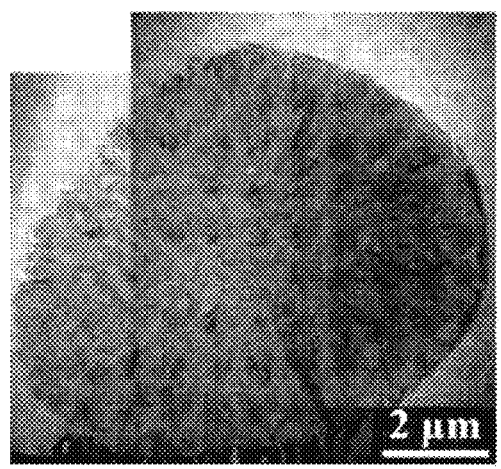
Figure 34:
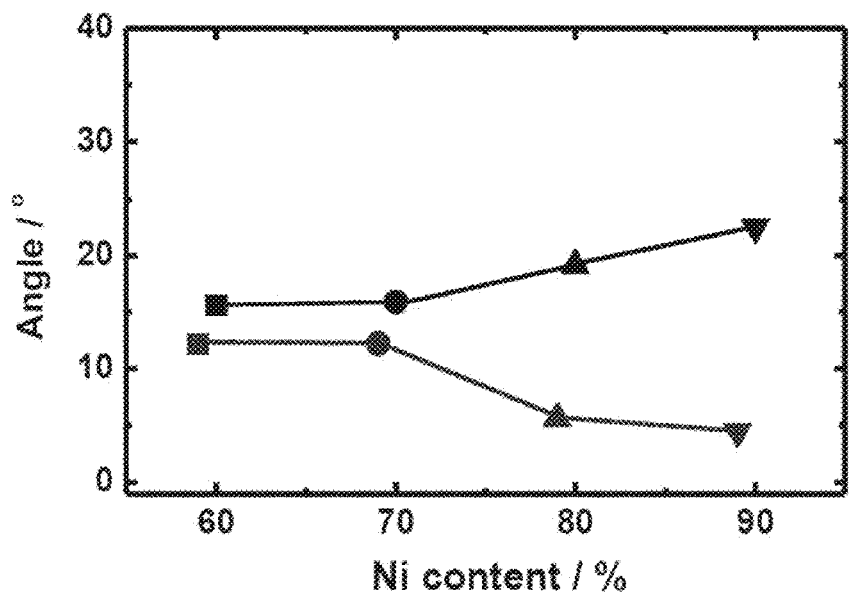
FIG. 34 is a graph illustrating an evaluated arrangement property of the primary particle according to the content of nickel in the positive active materials according to Examples and Comparative Examples of the present invention.

FIG. 29 is SEM pictures of positive active materials according to Comparative Example 1-1 and Example 1-1 of the present invention, FIG. 30 is SEM pictures of positive active materials according to Comparative Example 1-2 and Example 1-2 of the present invention, FIG. 31 is SEM pictures of positive active materials according to Comparative Example 1-3 and Example 1-3 of the present invention, FIG. 32 is TEM picture of positive active materials according to Comparative Example 1-4 and Example 1-4-1 of the present invention, FIG. 33 is TEM pictures of positive active materials according to Comparative Example 1-5 and Example 1-5-2 of the present invention, and FIG. 34 is a graph illustrating an evaluated arrangement property of the primary particle according to the content of nickel in the positive active materials according to Examples and Comparative Examples of the present invention.

Referring to FIGS. 29 to 34, SEM pictures and TEM pictures of the positive active materials according to Comparative Examples 1-1 to 1-5 and Examples 1-1 to 1-3, Example 1-4-1, and Example 1-5-2 were taken. The arrangement property of the primary particle was measured by using the SEM pictures and the TEM pictures. Particularly, an average angle (°) according to a nickel concentration (mol %) was measured by measuring a clearance angle between the radiation direction from the center portion of the particle to the surface of the particle and an extension direction of the outermost primary particle of the particles, and is illustrated in FIG. 34 and is organized in the table below.

TABLE 6

| Classification | Ni concentration | Average angle | Classification | Ni concentration | Average angle |
|---|---|---|---|---|---|
| Comparative Example 1-1 | 60 | 15.6 | Example 1-1 | 59 | 12.2 |
| Comparative Example 1-2 | 70 | 15.9 | Example 1-2 | 69 | 12.2 |
| Comparative Example 1-3 | 80 | 19.2 | Example 1-3 | 79 | 5.6 |
| Comparative Example 1-5 | 90 | 22.5 | Example 1-5-2 | 89 | 4.4 |

As can be seen in Table 6 and FIG. 34, in the Examples of the present invention, the average angle may be 12.2° or less. The average angle means an angle value obtained by measuring the angles between a reference line that is a line connecting a center portion 10 of the secondary particle (see FIG. 4) and a center portion of the primary particle provided at the outermost portion of the secondary particle and a particle orientation line that is a line penetrating the center portion of the primary particle and extending in parallel to an orientation direction of the primary particles and calculating the average of the measured angles. Further, when the concentration of nickel is 79o1% or more like Examples 1-3 and 1-5-2, the average anglel may be 5.6° or less, and a standard deviation may be 4.5 or less. In the meantime, like the Comparative Examples, when boron is not doped, it can be seen that as the concentration of nickel increases, the average angle increases. That is, it can be seen that the primary particles are arranged in a disorderly manner, so that the orientation of the primary particle is decreased. In the meantime, it can be seen that when boron is doped, the average angle is small compared to the case where boron is not doped. That is, the orientation of the primary particles may be increased by the boron doping, and when the orientation of the primary particles increases, so that the primary particles are arranged in the radiation direction, as described above, stress according to the contraction and the expansion of the primary particle in the c-axis direction generated during the charge/discharge process may be efficiently resolved, thereby improving charge/discharge efficiency and the life-span characteristic. Further, it can be seen that when the concentration of nickel is 79 mol % or more, the amount of decrease in the average angle by the boron doping significantly increases compared to the amount of decrease in the average angle by the boron doping when the concentration of nickel is 70 mol % or less. That is, it can be seen that the performance of the boron doping on the positive active material precursor of the high-concentration nickel of 79 mol % or more is the efficient method of improving orientation of the primary particle.

Figure 35:
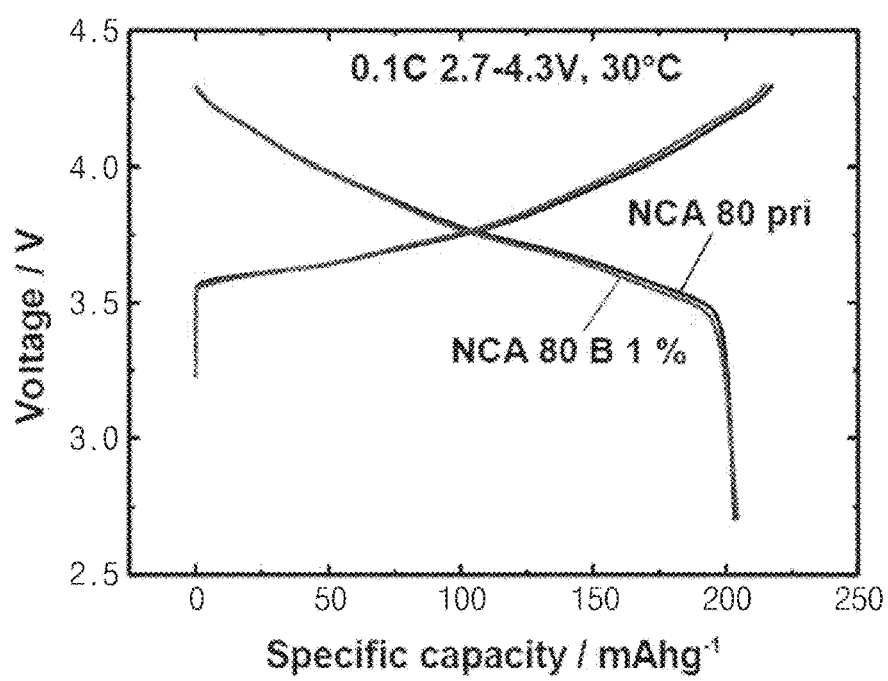
FIG. 35 is a graph illustrating measured capacity characteristics of lithium secondary batteries including positive active materials according to Example 1-3 and Comparative Example 1-3 of the present invention.
Figure 36:
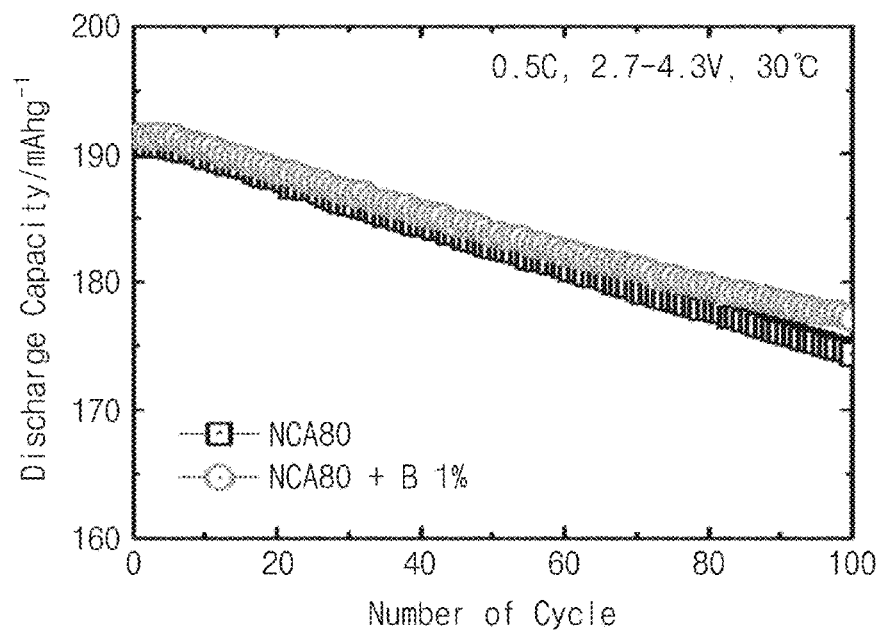
FIG. 36 is a graph illustrating measured life-span characteristics of the lithium secondary batteries including the positive active materials according to Example 1-3 and Comparative Example 1-3 of the present invention.

FIG. 35 is a graph illustrating measured capacity characteristics of lithium secondary batteries including the positive active materials according to Example 1-3 and Comparative Example 1-3 of the present invention, and FIG. 36 is a graph illustrating measured life-span characteristics of the lithium secondary batteries including the positive active materials according to Example 1-3 and Comparative Example 1-3 of the present invention.

Referring to FIGS. 35 and 36, half cells were manufactured by using the positive active materials according to Example 1-3 and Comparative Example 1-3, a discharge capacity was measured under the condition of cut off 2.7 to 4.3V, 0.1 C, and a temperature of 30° C., and a capacity change according to the number of times of the charge/discharge cycle was measured under the condition of cut off 2.7 to 4.3V, 0.5 C, and a temperature of 30° C.

In the drawing, NCA 80 pri means the positive active material according to Comparative Example 1-3 and NCA 80 B1% means the positive active material according to Example 1-3.

TABLE 7

| Classification | 0.1C, 1st Dis-Capa (mAh/g) | 1st Efficiency | 0.2C Capacity (mAh/g) | 0.2C/0.1C | 0.5C Capacity (mAh/g) | 0.5C/0.1C | 0.5C Cycle Retention |
|---|---|---|---|---|---|---|---|
| Comparative Example 1-3 | 203.2 | 93.2% | 198.9 | 97.9% | 190.7 | 93.9% | 91.4% (cycle 100) |
| Example 1-3 | 204.3 | 94.8% | 199.9 | 97.9% | 191.6 | 93.8% | 92.5% (cycle 100) |

Figure 37:
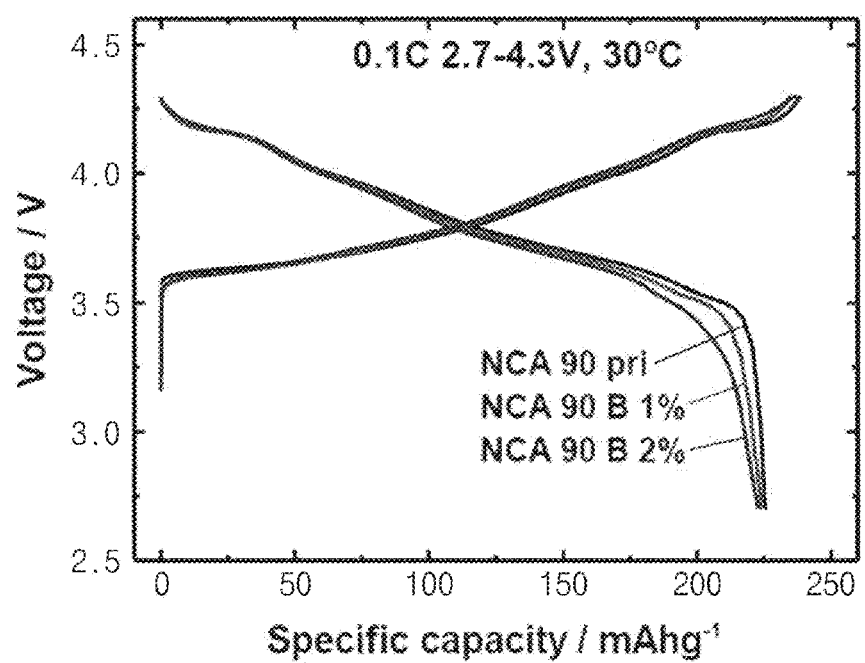
FIG. 37 is a graph illustrating measured capacity characteristics of lithium secondary batteries including positive active materials according to Examples 1-4-1 and 1-4-2 and Comparative Example 1-4 of the present invention.

As can be seen in Table 7, and FIGS. 35 and 36, it can be seen that according to the performance of the charge/discharge process, the capacity of the lithium secondary battery including the positive active material according to Comparative Example 1-3 decreases, but the decrease in the capacity of the lithium secondary battery including the positive active material according to Example 1-3 is not relatively large. That is, it can be seen that the manufacturing of the lithium secondary battery by using the positive active material doped with boron is the effective method of improving a life-span characteristic. FIG. 37 is a graph illustrating measured capacity characteristics of lithium secondary batteries including positive active materials according to Examples 1-4-1 and 1-4-2 and Comparative Example 1-4 of the present invention, and FIG. 38 is a graph illustrating measured life-span characteristics of the lithium secondary batteries including the positive active materials according to Examples 1-4-1 and 1-4-2 and Comparative Example 1-4 of the present invention.

Figure 38:
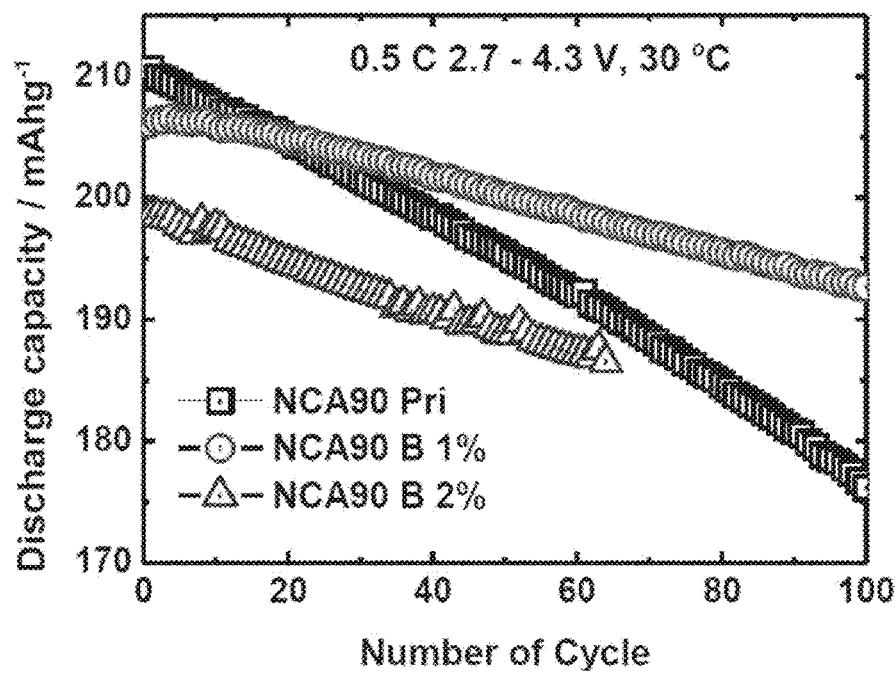
FIG. 38 is a graph illustrating measured life-span characteristics of the lithium secondary batteries including the positive active materials according to Examples 1-4-1 and 1-4-2 and Comparative Example 1-4 of the present invention.

Referring to FIGS. 37 and 38, half cells were manufactured by using the positive active materials according to Examples 1-4-1 and 1-4-2 and Comparative Example 1-4, a discharge capacity was measured under the condition of cut off 2.7 to 4.3V, 0.1 C, and a temperature of 30° C., and a capacity change according to the number of times of the charge/discharge cycle was measured under the condition of cut off 2.7 to 4.3V, 0.5 C, and a temperature of 30° C.

In the drawing, NCA 90 pri means the positive active material according to Comparative Examples 1-4, NCA 90 B 1% means the positive active material according to Examples 1-4-1, and NCA 90 B2% means the positive active material according to Example 1-4-2.

Figure 39:
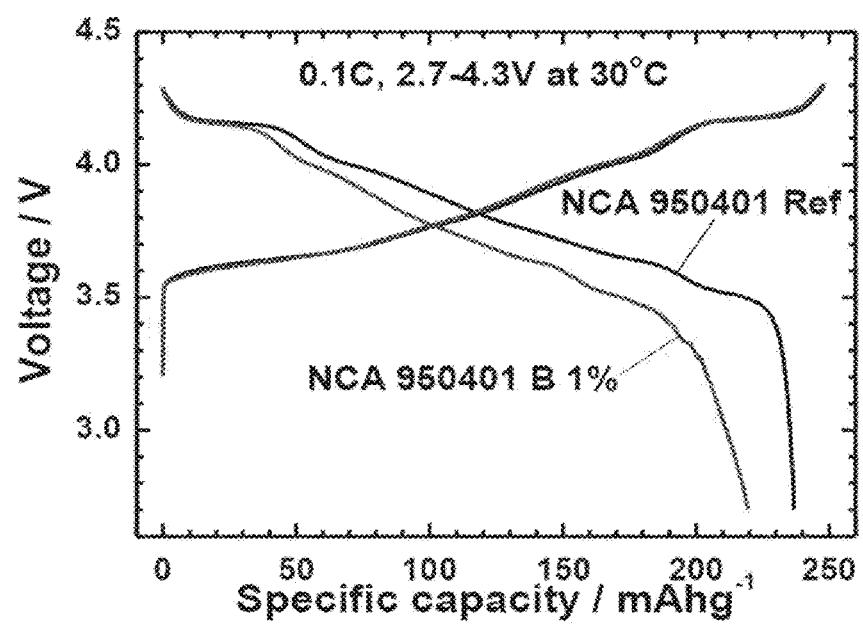
FIG. 39 is a graph illustrating measured capacity characteristics of lithium secondary batteries including positive active materials according to Example 1-6 and Comparative Example 1-6 of the present invention.

As can be seen in Table 8, and FIGS. 37 and 38, it can be seen that according to the performance of the charge/discharge process, the capacity of the lithium secondary battery including the positive active material according to Comparative Example 1-4 decreases, but the decrease in the capacity of the lithium secondary battery including the positive active material according to Example 1-4-1 is not relatively large. That is, it can be seen that the manufacturing of the lithium secondary battery by using the positive active material doped with boron is the effective method of improving a life-span characteristic. FIG. 39 is a graph illustrating measured capacity characteristics of lithium secondary batteries including positive active materials according to Example 1-6 and Comparative Example 1-6 of the present invention, and FIG. 40 is a graph illustrating measured life-span characteristics of the lithium secondary batteries including the positive active materials according to Example 1-6 and Comparative Example 1-6 of the present invention.

Figure 40:
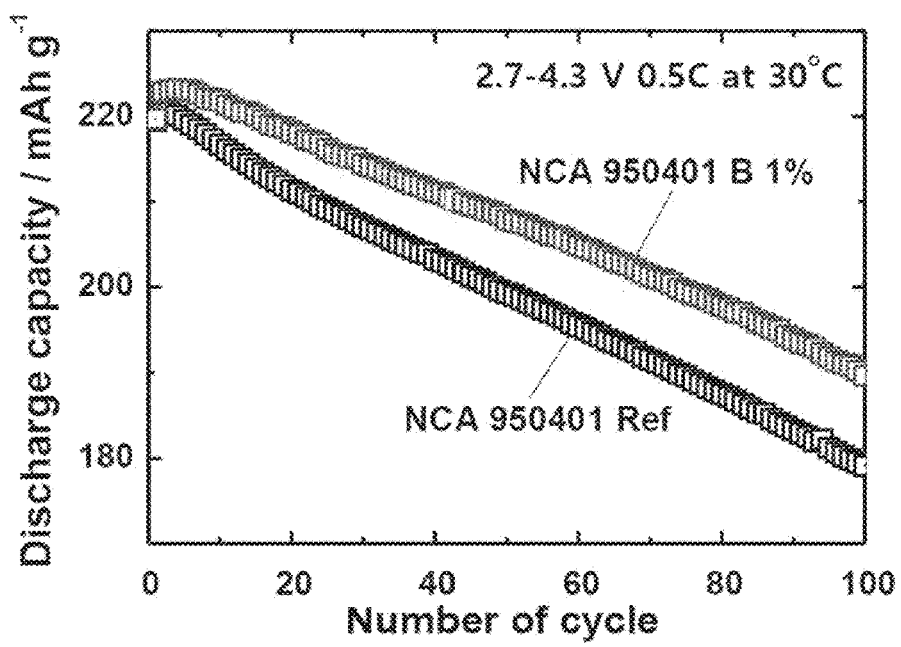
FIG. 40 is a graph illustrating measured life-span characteristics of the lithium secondary batteries including the positive active materials according to Example 1-6 and Comparative Example 1-6 of the present invention.

Referring to FIGS. 39 and 40, half cells were manufactured by using the positive active materials according to Example 1-6 and Comparative Example 1-6, a discharge capacity was measured under the condition of cut off 2.7 to 4.3V, 0.1 C, and a temperature of 30° C., and a capacity change according to the number of times of the charge/discharge cycle was measured under the condition of cut off 2.7 to 4.3V, 0.5 C, and a temperature of 30° C.

In the drawing, NCA 950401 Ref means the positive active material according to Comparative Example 1-6, and NCA 950401 B 1% means the positive active material according to Example 1-6.

TABLE 8

| Classification | 0.1C, 1st Dis-Capa (mAh/g) | 1st Efficiency | 0.2C Capacity (mAh/g) | 0.2C/0.1C | 0.5C Capacity (mAh/g) | 0.5C/0.1C | 0.5C Cycle Retention |
|---|---|---|---|---|---|---|---|
| Comparative Example 1-4 | 225.1 | 95.1% | 220.3 | 97.9% | 210.3 | 93.5% | 83.7% (cycle 100) |
| Example 1-4-1 | 222.4 | 94.5% | 216.7 | 97.4% | 206.1 | 92.7% | 93.5% (cycle 100) |
| Example 1-4-2 | 222.8 | 93.8% | 214.3 | 96.2% | 198.3 | 89.0% | 94.0% (cycle 64) |

TABLE 9

| Classification | 0.1C, 1st Dis-Capa (mAh/g) | 1st Efficiency | 0.2C Capacity (mAh/g) | 0.2C/0.1C | 0.5C Capacity (mAh/g) | 0.5C/0.1C | 0.5C Cycle Retention |
|---|---|---|---|---|---|---|---|
| Comparative Example 1-6 | 236.8 | 95.1% | 231.3 | 97.7% | 219.4 | 92.7% | 81.6% (cycle 100) |
| Example 1-6 | 219.5 | 88.3% | 218.8 | 99.7% | 219.7 | 100.1% | 86.3% (cycle 100) |

Figure 41:
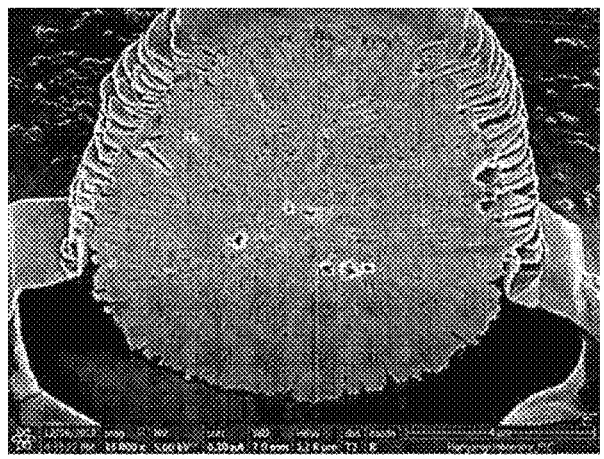
FIG. 41 is a SEM picture of positive active material precursors and positive active materials according to Examples 2-1-1 and 2-1-2 of the present invention.
Figure 41:
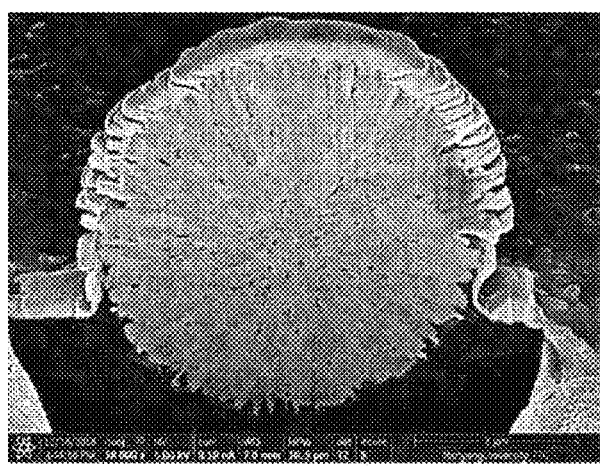

As can be seen in Table 9, and FIGS. 39 and 40, it can be seen that according to the performance of the charge/discharge process, the capacity of the lithium secondary battery including the positive active material according to Comparative Example 1-6 decreases, but the decrease in the capacity of the lithium secondary battery including the positive active material according to Example 1-6 is not relatively large. That is, it can be seen that the manufacturing of the lithium secondary battery by using the positive active material doped with boron is the effective method of improving a life-span characteristic. FIG. 41 is a SEM picture of positive active material precursors and positive active materials according to Examples 2-1-1 and 2-1-2 of the present invention, FIG. 42 is a graph illustrating measured capacity characteristics of the lithium secondary batteries including the positive active materials according to Examples 2-1-1 to 2-1-3 of the present invention, and FIG. 43 is a graph illustrating measured life-span characteristics of the lithium secondary batteries including the positive active materials according to Examples 2-1-1 to 2-1-3 of the present invention.

Figure 42:
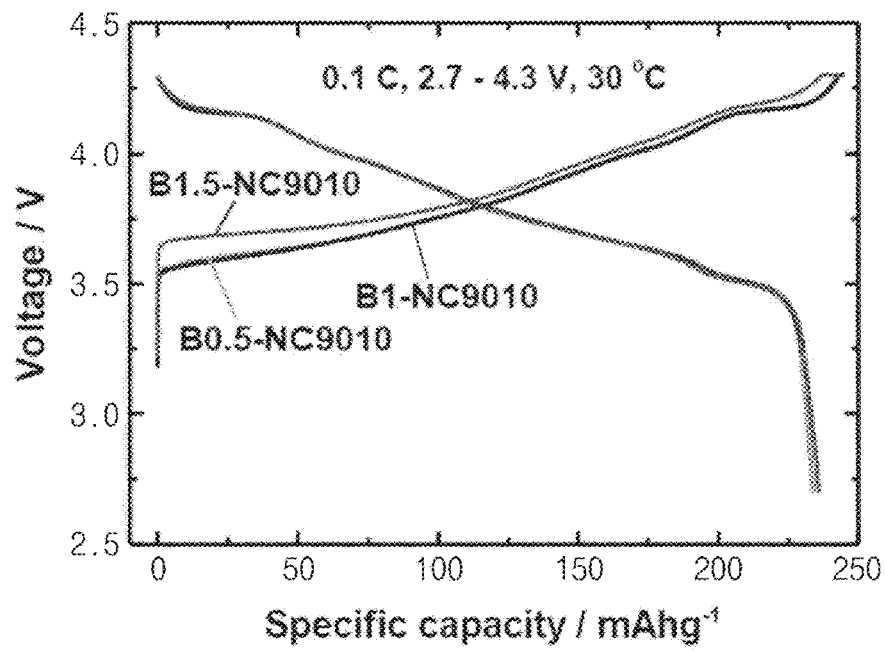
FIG. 42 is a graph illustrating measured capacity characteristics of the lithium secondary batteries including the positive active materials according to Examples 2-1-1 to 2-1-3 of the present invention.
Figure 43:
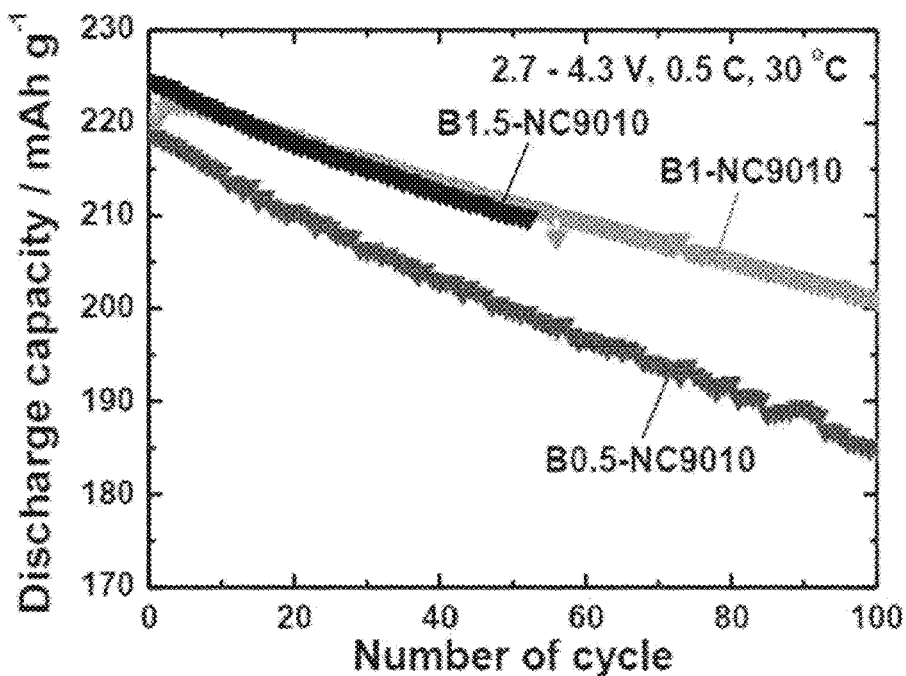
FIG. 43 is a graph illustrating measured life-span characteristics of the lithium secondary batteries including the positive active materials according to Examples 2-1-1 to 2-1-3 of the present invention.

Referring to FIGS. 41 to 43, half cells were manufactured by using the positive active materials according to Examples 2-1-1 to 2-1-3, a discharge capacity was measured under the condition of cut off 2.7 to 4.3V, 0.1 C, and a temperature of 30° C., and a capacity change according to the number of times of the charge/discharge cycle was measured under the condition of cut off 2.7 to 4.3V, 0.5 C, and a temperature of 30° C.

In the drawing, B0.5-NC9010, B 1-NC9010, and B1.5-NC9010 mean the positive active materials according to Examples 2-1-1 to 2-1-3, respectively.

TABLE 10

| Classification | 0.1C, 1st Dis-Capa (mAh/g) | 1st Efficiency | 0.2C Capacity (mAh/g) | 0.2C/0.1C | 0.5C Capacity (mAh/g) | 0.5C/0.1C | 0.5C Cycle Retention |
|---|---|---|---|---|---|---|---|
| Example 2-1-1 | 233.7 | 96.2% | 228.5 | 97.8% | 218.5 | 93.5% | 84.7% (100 cycle) |
| Example 2-1-2 | 236.0 | 96.7% | 230.5 | 97.7% | 220.4 | 93.4% | 91.2% (100 cycle) |
| Example 2-1-3 | 235.6 | 96.7% | 232.2 | 98.6% | 224.4 | 95.2% | 93.5% (52 cycle) |

Figure 44:
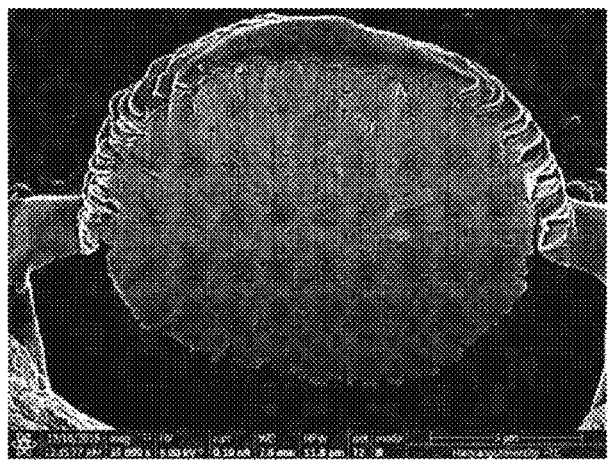
FIG. 44 is a SEM picture of positive active material precursors and positive active materials according to Examples 2-2-1 and 2-2-2 of the present invention.
Figure 44:
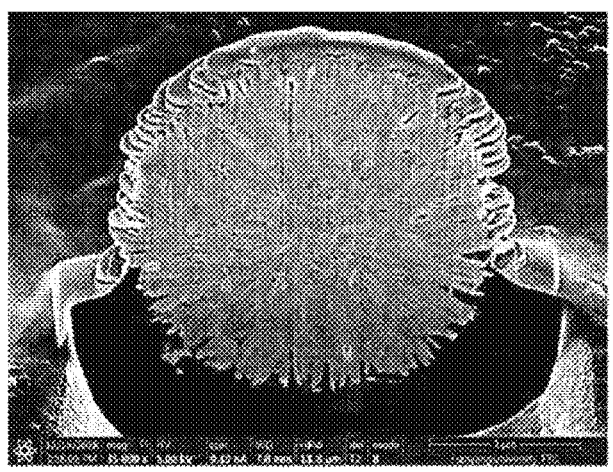

As can be seen in Table 10, and FIGS. 42 and 43, it can be seen that according to the performance of the charge/discharge process, the decrease in the capacity of the lithium secondary batteries including the positive active materials according to Examples 2-1-1 to 2-1-3 is not relatively large. That is, it can be seen that the manufacturing of the lithium secondary battery by using the positive active material doped with boron is the effective method of improving a life-span characteristic. FIG. 44 is a SEM picture of positive active material precursors and positive active materials according to Examples 2-2-1 and 2-2-2 of the present invention, FIG. 45 is a graph illustrating measured capacity characteristics of the lithium secondary batteries including the positive active materials according to Examples 2-2-1 to 2-2-3 and Comparative Example 1-4 of the present invention, and FIG. 46 is a graph illustrating measured life-span characteristics of the lithium secondary batteries including the positive active materials according to Examples 2-2-1 to 2-2-3 and Comparative Example 1-4 of the present invention.

Figure 45:
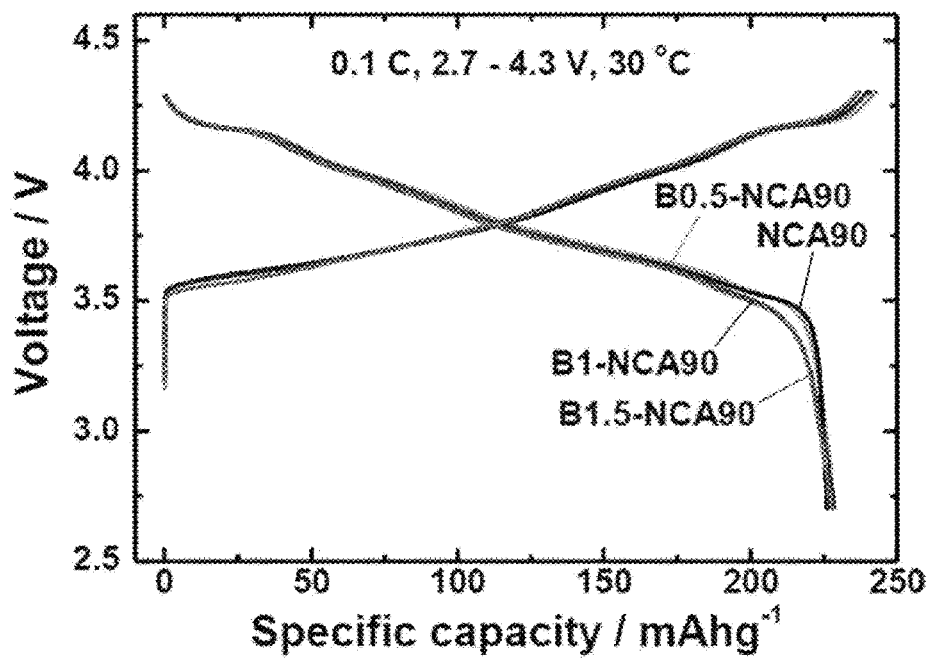
FIG. 45 is a graph illustrating measured capacity characteristics of the lithium secondary batteries including the positive active materials according to Examples 2-2-1 to 2-2-3 and Comparative Example 1-4 of the present invention.
Figure 46:
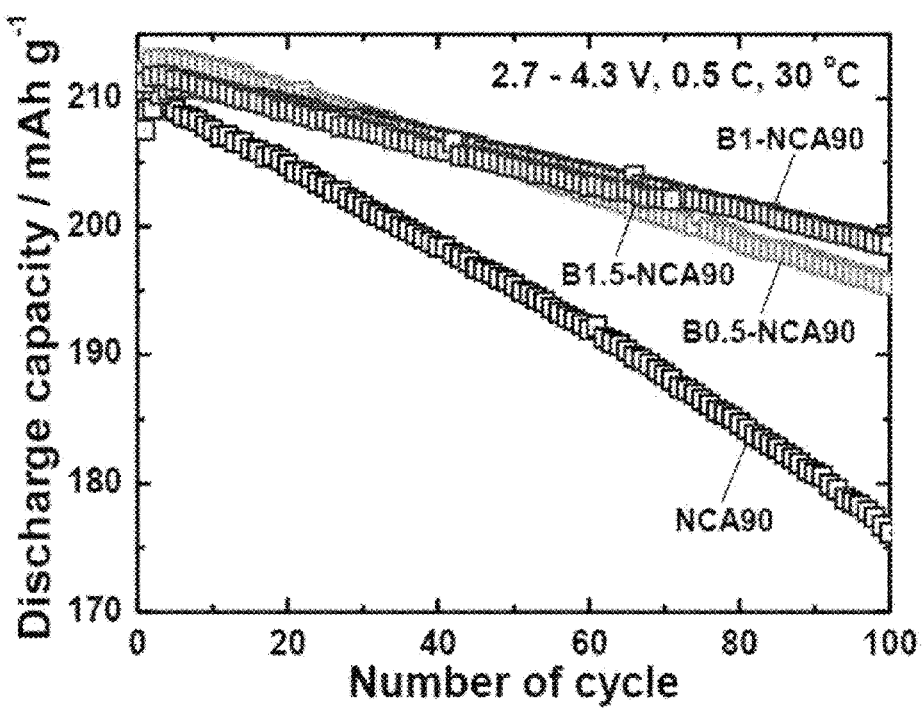
FIG. 46 is a graph illustrating measured life-span characteristics of the lithium secondary batteries including the positive active materials according to Examples 2-2-1 to 2-2-3 and Comparative Example 1-4 of the present invention.

Referring to FIGS. 44 to 46, half cells were manufactured by using the positive active materials according to Examples 2-2-1 to 2-2-3, a discharge capacity was measured under the condition of cut off 2.7 to 4.3V, 0.1 C, and a temperature of 30° C., and a capacity change according to the number of times of the charge/discharge cycle was measured under the condition of cut off 2.7 to 4.3V, 0.5 C, and a temperature of 30° C.

In the drawing, NCA90 means the positive active material according to Comparative Example 1-4, and B0.5-NCA90, B 1-NCA90, and B1.5-NCA90 mean the positive active materials according to Examples 2-2-1 to 2-2-3, respectively.

TABLE 11

| Classification | 0.1C, 1st Dis-Capa (mAh/g) | 1st Efficiency | 0.2C Capacity (mAh/g) | 0.2C/0.1C | 0.5C Capacity (mAh/g) | 0.5C/0.1C | 0.5C Cycle Retention |
|---|---|---|---|---|---|---|---|
| Comparative Example 1-4 | 225.1 | 95.1% | 220.3 | 97.9% | 210.6 | 93.5% | 83.7% (100 cycle) |
| Example 2-1-1 | 228.5 | 94.2% | 222.3 | 97.3% | 212.1 | 92.8% | 92.2% (100 cycle) |
| Example 2-1-2 | 228.7 | 95.1% | 220.1 | 96.2% | 207.5 | 90.8% | 95.7% (100 cycle) |
| Example 2-1-3 | 227.6 | 95.8% | 222.4 | 97.7% | 211.2 | 92.8% | 95.7% (71 cycle) |

Figure 47:
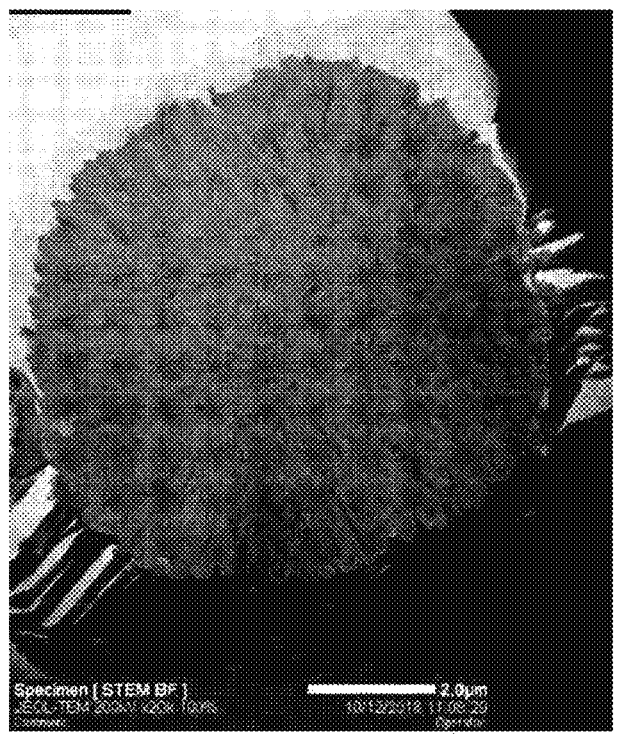
FIG. 47 is a TEM picture of a positive active material according to Example 3 of the present invention.

As can be seen in Table 11, and FIGS. 45 and 46, it can be seen that according to the performance of the charge/discharge process, the capacity of the lithium secondary battery including the positive active material according to Comparative Example 1-4 decreases, but the decrease in the capacity of the lithium secondary batteries including the positive active materials according to Examples 2-2-1 to 2-2-3 is not relatively large. That is, it can be seen that the manufacturing of the lithium secondary battery by using the positive active material doped with boron is the effective method of improving a life-span characteristic. FIG. 47 is a TEM picture of a positive active material according to Example 3 of the present invention. Referring to FIG. 47, a TEM picture of a positive active material according to Example 3 of the present invention was taken. The arrangement property of the primary particle was measured by using the TEM picture. Aa can be seen in FIG. 47, it can be seen that when tungsten is doped, orientation of the primary particles increases, so that the primary particles are arranged in the radiation direction.

Figure 48:
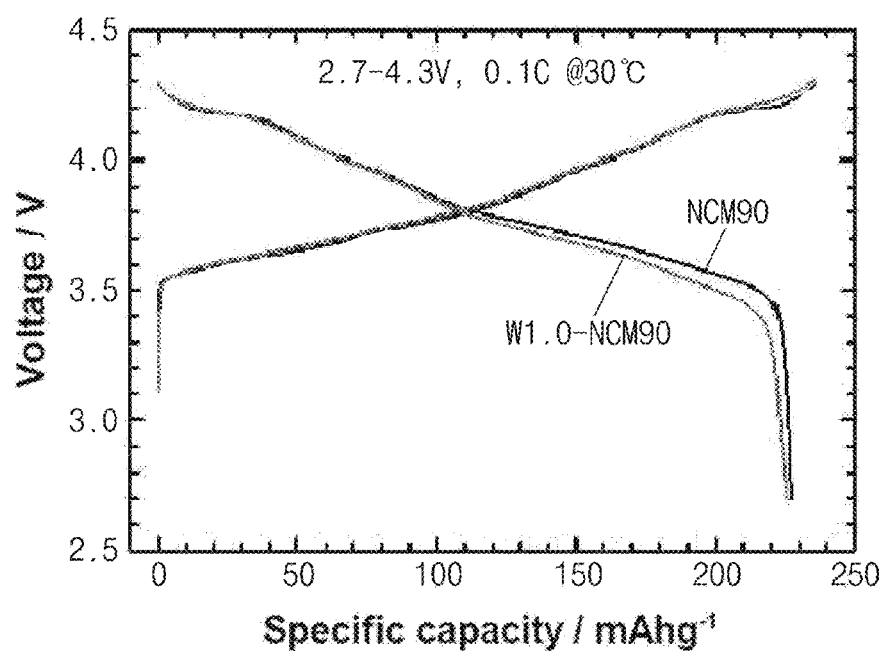
FIG. 48 is a graph illustrating measured capacity characteristics of the lithium secondary batteries including the positive active materials according to Example 3 and Comparative Example 1-5 of the present invention.
Figure 49:
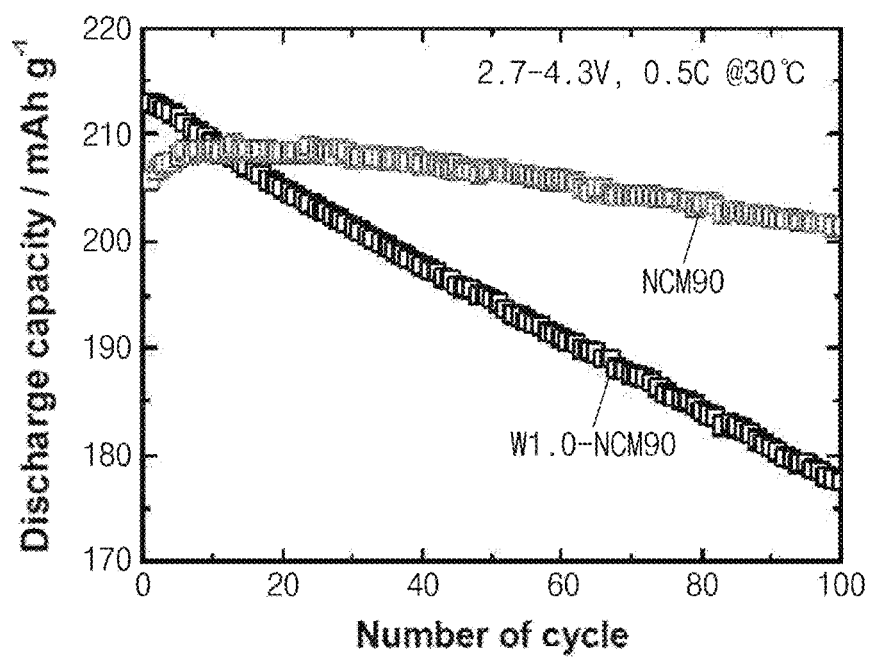
FIG. 49 is a graph illustrating measured life-span characteristics of the lithium secondary batteries including the positive active materials according to Example 3 and Comparative Example 1-5 of the present invention.

FIG. 48 is a graph illustrating measured capacity characteristics of the lithium secondary batteries including the positive active materials according to Example 3 and Comparative Example 1-5 of the present invention, and FIG. 49 is a graph illustrating measured life-span characteristics of the lithium secondary batteries including the positive active materials according to Example 3 and Comparative Example 1-5 of the present invention.

Referring to FIGS. 48 and 49, half cells were manufactured by using the positive active materials according to Example 3 and Comparative Example 1-5, a discharge capacity was measured under the condition of cut off 2.7 to 4.3V, 0.1 C, and a temperature of 30° C., and a capacity change according to the number of times of the charge/discharge cycle was measured under the condition of cut off 2.7 to 4.3V, 0.5 C, and a temperature of 30° C.

In the drawing, NCM 90 means the positive active material according to Comparative Example 1-5, and W1.0-NCM 90 means the positive active material according to Example 3.

As can be seen in FIGS. 48 and 49, it can be seen that according to the performance of the charge/discharge process, the capacity of the lithium secondary battery including the positive active material according to Comparative Example 1-5 decreases, but the decrease in the capacity of the lithium secondary battery including the positive active material according to Example 3 is not relatively large. That is, the manufacturing the lithium secondary battery by using the tungsten-doped positive active material is the effective method of improving the life-span characteristic.

In the foregoing, the exemplary embodiment of the present invention has been described in detail, but the scope of the present invention is not limited to the specific exemplary embodiment, and shall be interpreted by the accompanying claims. Further, it would be appreciated by those skilled in the art that many changes and modifications might be made without departing from the scope of the invention.

INDUSTRIAL APPLICABILITY

The positive active material according to the exemplary embodiment of the present invention, the method of preparing the same, a lithium secondary battery including the same are applicable to an electric vehicle, an ESS, and a portable electronic device

The invention claimed is:

1. A positive active material comprising:
a secondary particle in which a plurality of primary particles is agglomerated, wherein:
the positive active material is composed of a compound containing nickel, lithium, and oxygen, and
an average angle between a reference line that is a line connecting a center portion of the secondary particle and a center portion of the primary particle provided at the outermost portion of the secondary particle and a particle orientation line that is a line penetrating the center portion of the primary particle provided at the outermost portion of the secondary particle and extending in parallel to an orientation direction of the primary particles is 12.2° or less,
wherein a concentration of the nickel in the compound is 59 mol % or more,
wherein the compound further includes an added metal composed of a different element from the nickel and the lithium, and
wherein the added metal includes tungsten (W).

2. The positive active material of claim 1, wherein when the concentration of the nickel is 79 mol % or more, the average angle is 5.6° or less and a standard deviation is 4.5 or less.

3. The positive active material of claim 1, wherein:
the compound further includes an added metal composed of a different element from the nickel and the lithium, and
an aspect ratio of the primary particle increases by the added metal.

4. The positive active material of claim 1, wherein compound further includes at least one of aluminum, cobalt, and manganese.

5. The positive active material of claim 1, wherein:
the compound further includes an added metal composed of a different element from the nickel and the lithium, and
the added metal is included in the primary particle by doping of the added metal, and the added metal is provided on a surface portion of the primary particle in at least a part of the primary particle.

6. The positive active material of claim 1, wherein:
the compound further includes an added metal composed of a different element from the nickel and the lithium, and
the compound is expressed by $Li_aM1_xM2_yM3_zO_2$, in which:

$1 \leq a \leq 1.1$,
$0.59 \leq x < 1$,
$0 \leq y \leq 0.2$,
$0 < z \leq 0.02$,
M1 is nickel,
M2 includes at least one of aluminum, cobalt, and manganese, and
M3 includes Tungsten (W).

7. The positive active material of claim 6, wherein the (003) surface of the primary particle is arranged to be parallel to a direction from the center portion to a surface portion of the secondary particle.

8. The positive active material of claim 1, wherein:
a concentration of the added metal is 2 mol % or less.

9. A lithium secondary battery comprising:
a positive electrode including the positive active material of claim 1,
a negative electrode spaced apart from the positive electrode; and
an electrolyte between the positive electrode and the negative electrode.

* * * * *